(12) United States Patent
Hassan et al.

(10) Patent No.: US 11,652,773 B2
(45) Date of Patent: May 16, 2023

(54) ENHANCED CONTROL OF USER INTERFACE FORMATS FOR MESSAGE THREADS BASED ON DEVICE FORM FACTORS OR TOPIC PRIORITIES

(71) Applicant: MICROSOFT TECHNOLOGY LICENSING, LLC, Redmond, WA (US)

(72) Inventors: Amer Aref Hassan, Kirkland, WA (US); Gareth Lyndon Eadred Bridges, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/332,991

(22) Filed: May 27, 2021

(65) Prior Publication Data
US 2022/0385608 A1 Dec. 1, 2022

(51) Int. Cl.
*H04L 51/216* (2022.01)
*G06F 3/0481* (2022.01)
*H04L 51/06* (2022.01)

(52) U.S. Cl.
CPC .......... *H04L 51/216* (2022.05); *G06F 3/0481* (2013.01); *H04L 51/06* (2013.01)

(58) Field of Classification Search
CPC ... G06F 3/0481; H04L 51/224; H04L 51/226; H04L 51/06; H04L 51/066; H04L 51/216
See application file for complete search history.

(56) References Cited

U.S. PATENT DOCUMENTS 6,515,681 B1 2/2003 Knight
7,328,242 B1 2/2008 Mccarthy et al.
(Continued)

FOREIGN PATENT DOCUMENTS

WO 2015005606 A1 1/2015
WO 2019023974 A1 2/2019

OTHER PUBLICATIONS

"Add a Chat Activity in Moodle", Retrieved from: https://web.archive.org/web/20171206184009/https://www.umass.edu/it/support/moodle/add-a-chat-activity-moodle, Dec. 6, 2017, 12 Pages.
(Continued)

*Primary Examiner* — Nicholas Ulrich
(74) *Attorney, Agent, or Firm* — Scott Y. Shigeta; Newport IP, LLC

(57) ABSTRACT

The system manages a data structure that defines at least one topic limit for each client computer. The data structure can cause each client computer to display different user interface formats based on a topic limit that is allowed per thread. The data structure causes some devices, which may have a limited viewing area, to only show a single-topic thread, while the data structure also causes other devices to display multi-topic threads. Thus, for high priority topics or for devices having a limited display area, the system can cause the display of a single-topic thread pertaining to a topic to which an incoming message corresponds. This feature can improve user interaction by bringing focus to high priority threads when messages of a particular topic are received at select devices, while allowing other devices to provide a broader perspective of thread formats having multiple topics when the same messages are received.

20 Claims, 14 Drawing Sheets

(56) References Cited

U.S. PATENT DOCUMENTS

| | | | |
|---|---|---|---|
| 7,383,307 | B2 | 6/2008 | Kirkland et al. |
| 7,620,407 | B1 | 11/2009 | Donald et al. |
| 7,725,538 | B2 | 5/2010 | Kirkland et al. |
| 7,788,599 | B2 | 8/2010 | Williams et al. |
| 7,904,515 | B2 | 3/2011 | Ambati et al. |
| 7,962,555 | B2 | 6/2011 | Sastry et al. |
| 8,001,184 | B2 | 8/2011 | Etgen et al. |
| 8,103,970 | B1 | 1/2012 | Allen et al. |
| 8,190,999 | B2 | 5/2012 | Chen et al. |
| 8,555,178 | B2 | 10/2013 | Blair |
| 8,762,475 | B2 | 6/2014 | Cheung et al. |
| 9,219,704 | B2 | 12/2015 | Hamlin et al. |
| 9,275,118 | B2 | 3/2016 | Brezina et al. |
| 9,344,389 | B2 | 5/2016 | Hind et al. |
| 9,847,959 | B2 | 12/2017 | Akavaram et al. |
| 10,116,599 | B2 | 10/2018 | Wu et al. |
| 10,356,025 | B2 | 7/2019 | Allen et al. |
| 10,509,531 | B2 | 12/2019 | Sharifi et al. |
| 10,523,613 | B1 | 12/2019 | Alm et al. |
| 10,587,539 | B2 | 3/2020 | Mahood et al. |
| 10,601,753 | B2 | 3/2020 | Draeger et al. |
| 10,819,532 | B1 | 10/2020 | Van Rensburg et al. |
| 10,862,840 | B2 | 12/2020 | Claux et al. |
| 10,901,603 | B2 | 1/2021 | Boothroyd et al. |
| 10,977,258 | B1 | 4/2021 | Liu et al. |
| 10,979,377 | B1 | 4/2021 | Gupta et al. |
| 11,093,125 | B1 | 8/2021 | Van Doorn et al. |
| 11,153,235 | B1 | 10/2021 | Dalonzo et al. |
| 11,165,739 | B1 | 11/2021 | Dodsworth |
| 2004/0078435 | A1 | 4/2004 | Dunbar et al. |
| 2005/0149621 | A1 | 7/2005 | Kirkland et al. |
| 2005/0262199 | A1* | 11/2005 | Chen ................... H04L 51/04 709/204 |
| 2008/0082607 | A1 | 4/2008 | Sastry et al. |
| 2009/0083389 | A1 | 3/2009 | Kirkland et al. |
| 2009/0313334 | A1 | 12/2009 | Seacat et al. |
| 2010/0017483 | A1 | 1/2010 | Estrada |
| 2011/0029898 | A1 | 2/2011 | Malik |
| 2011/0126126 | A1 | 5/2011 | Blair |
| 2011/0185288 | A1 | 7/2011 | Gupta et al. |
| 2012/0317499 | A1 | 12/2012 | Shen |
| 2014/0096033 | A1 | 4/2014 | Blair |
| 2014/0201216 | A1 | 7/2014 | Bryant et al. |
| 2014/0223347 | A1 | 8/2014 | Seo et al. |
| 2014/0245178 | A1 | 8/2014 | Smith et al. |
| 2014/0279716 | A1 | 9/2014 | Cormack et al. |
| 2014/0310365 | A1 | 10/2014 | Sample et al. |
| 2015/0081713 | A1 | 3/2015 | Kandylas et al. |
| 2015/0324424 | A1 | 11/2015 | Bhide et al. |
| 2016/0065519 | A1 | 3/2016 | Waltermann et al. |
| 2016/0117384 | A1 | 4/2016 | Akavaram et al. |
| 2016/0119265 | A1 | 4/2016 | Akavaram et al. |
| 2016/0260176 | A1 | 9/2016 | Bernard et al. |
| 2016/0364368 | A1* | 12/2016 | Chen ................... H04L 51/216 |
| 2017/0149713 | A1* | 5/2017 | Bastide ............... H04L 51/216 |
| 2017/0272388 | A1 | 9/2017 | Bem et al. |
| 2017/0351385 | A1 | 12/2017 | Ertmann et al. |
| 2017/0353414 | A1 | 12/2017 | Ertmann et al. |
| 2018/0041452 | A1 | 2/2018 | Reading et al. |
| 2018/0046628 | A1 | 2/2018 | Wang et al. |
| 2018/0048604 | A1 | 2/2018 | Mikhailov et al. |
| 2018/0165723 | A1 | 6/2018 | Wright et al. |
| 2018/0287982 | A1 | 10/2018 | Draeger et al. |
| 2018/0324116 | A1 | 11/2018 | Vaduva |
| 2018/0356952 | A1 | 12/2018 | Boothroyd et al. |
| 2019/0014065 | A1 | 1/2019 | Lim et al. |
| 2019/0121907 | A1 | 4/2019 | Brunn et al. |
| 2019/0245821 | A1 | 8/2019 | Crowe et al. |
| 2019/0281001 | A1 | 9/2019 | Miller et al. |
| 2020/0106731 | A1* | 4/2020 | Goenka ............... H04L 51/043 |
| 2020/0344082 | A1 | 10/2020 | Vuskovic et al. |
| 2021/0152506 | A1 | 5/2021 | Liu et al. |
| 2021/0319216 | A1 | 10/2021 | Anderson |
| 2022/0385605 | A1 | 12/2022 | Hassan et al. |
| 2022/0385606 | A1 | 12/2022 | Hassan et al. |
| 2022/0385607 | A1 | 12/2022 | Hassan |
| 2022/0385609 | A1 | 12/2022 | Hassan |

OTHER PUBLICATIONS

"How Do I Use Split Window View in Skype on Desktop?", Retrieved from: https://web.archive.org/web/20191115043649/https:/support.skype.com/en/faq/FA34880/how-do-i-use-split-window-view-in-skype-on-desktop, Nov. 15, 2019, 4 Pages.

"Manually Merge Conversations", Retrieved from: https://help.frontapp.com/t/x1249l/manually-merge-conversations, Sep. 16, 2016, 8 Pages.

"Microsoft Teams Resource and Training", Retrieved from: https://web.archive.org/web/20200626055701/https:/www.cityofbowie.org/2503/Microsoft-Teams-Resource-and-Training, Jun. 26, 2020, 6 Pages.

"Pop Out a Chat in Teams", Retrieved from: https://support.microsoft.com/en-gb/office/pop-out-a-chat-in-teams-cff95cb0-34af-423f-8f69-fe9106973790, Retrieved on: Feb. 9, 2021, 4 Pages.

"Pre-Assigning Participants to Breakout Rooms", Retrieved From: https://web.archive.org/web/20210203172424/https:/support.zoom.us/hc/en-us/articles/360032752671-Pre-assigning-participants-to-breakout-rooms, Feb. 3, 2021, 6 Pages.

"Use Emergency SOS on your Apple Watch", Retrieved from: https://web.archive.org/web/20200604141648/https://support.apple.com/en-in/HT206983, Jun. 4, 2020, 4 Pages.

"Use Threads to Organise Discussions", Retrieved From: https://web.archive.org/web/20201104193149/https:/slack.com/intl/en-in/help/articles/115000769927-Use-threads-to-organise-discussions-, Nov. 4, 2020, 3 Pages.

"Non Final Office Action Issued in U.S. Appl. No. 17/332,877", dated Apr. 28, 2022, 23 Pages.

"Final Office Action Issued in U.S. Appl. No. 17/332,921", dated Apr. 26, 2022, 34 Pages.

"Non Final Office Action Issued in U.S. Appl. No. 17/332,921", dated Oct. 26, 2021, 30 Pages.

"Final Office Action Issued in U.S. Appl. No. 17/332,958", dated Apr. 26, 2022, 24 Pages.

"Non Final Office Action Issued in U.S. Appl. No. 17/332,958", dated Oct. 26, 2021, 23 Pages.

"Non Final Office Action Issued in U.S. Appl. No. 17/333,004", dated Dec. 17, 2021, 17 Pages.

Abu-Jbara, et al., "Subgroup Detector: A System for Detecting Subgroups in Online Discussions", In Proceedings of the 50th Annual Meeting of the Association for Computational Linguistics, Jul. 8, 2012, pp. 133-138.

Adam, Alexandre, "Manage Your Layout", Retrieved From: https://support.symphony.com/hc/en-us/articles/360000701066-Manage-your-layout, Apr. 29, 2019, 1 Page.

Adams, et al., "Topic Detection and Extraction in Chat", In Proceedings of International Conference on Semantic Computing, Aug. 4, 2008, pp. 581-588.

Bengel, et al., "ChatTrack: Chat Room Topic Detection Using Classification", In Proceedings of the Conference Paper in Lecture Notes in Computer Science, Mar. 2004, 11 Pages.

Clover, Juli, "iOS 14: Everything New in Messages", Retrieved From: https://www.macrumors.com/guide/messages/, Jan. 22, 2021, 17 Pages.

Hutchinson, Andrew, "Facebook's Adding Post Topics to More Groups, Helping to Better Organize Relevant Discussion", Retrieved From: https://www.socialmediatoday.com/news/facebooks-adding-post-topics-to-more-groups-helping-to-better-organize-re/564699/, Oct. 10, 2019, 1 Page.

Tan, et al., "Context-Aware Conversation Thread Detection in Multi-Party Chat", In Proceedings of the Conference on Empirical Methods in Natural Language Processing, Nov. 3, 2019, pp. 6456-6461.

Constine, Josh, "Chat Multi-Tasking, Facebook Home's Game Changer, Could Rattle Apple and Google", Retrieved From: https://

(56) References Cited

OTHER PUBLICATIONS techcrunch.com/2013/04/07/chat-multi-tasking/?_ga=2.84845273. 1340773396.1613973171-1987933572.1611813039, Apr. 7, 2013, 5 Pages.

Li, Helena, "Howto Move Messages and Split Conversations", Retrieved From: https://web.archive.org/web/20200804224723/https:/help.frontapp.com/t/632vp7/how-to-move-messages-and-split-conversations, Jul. 7, 2020, 5 Pages.

"Final Office Action Issued in U.S. Appl. No. 17/333,004", dated Jul. 27, 2022, 17 Pages.

"International Search Report and Written Opinion Issued in PCT Application No. PCT/US22/026870", dated Jul. 26, 2022, 14 Pages.

"International Search Report and Written Opinion Issued in PCT Application No. PCT/US22/027187", dated Jul. 11, 2022, 12 Pages.

"International Search Report and Written Opinion Issued in PCT Application No. PCT/US22/027188", dated Aug. 2, 2022, 10 Pages.

"International Search Report and Written Opinion Issued in PCT Application No. PCT/US22/027192", dated Aug. 10, 2022, 11 Pages.

"International Search Report and Written Opinion Issued in PCT Application No. PCT/US22/027194", dated Jul. 11, 2022, 13 Pages.

"Notice of Allowance Issued in U.S. Appl. No. 17/333,004", dated Nov. 23, 2022, 11 Pages.

"Final Office Action Issued in U.S. Appl. No. 17/333,877", dated Dec. 13, 2022, 26 Pages.

"Non Final Office Action Issued in U.S. Appl. No. 17/332,958", dated Feb. 15, 2023, 27 Pages.

"Non Final Office Action Issued in U.S. Appl. No. 17/332,921", dated Mar. 9, 2023, 17 Pages.

\* cited by examiner

ENHANCED CONTROL OF USER INTERFACE FORMATS FOR MESSAGE THREADS BASED ON DEVICE FORM FACTORS OR TOPIC PRIORITIES

BACKGROUND

There are a number of different types of communication systems that allow users to collaborate. For example, some systems allow people to collaborate by sharing meeting chat messages, group chat messages, etc. Although these systems can be useful for allowing users to coordinate and share ideas, some existing systems have a number of drawbacks. For instance, some systems do not organize messages in a way that allows users to optimally manage large amounts of information. When a user has a number of text-based conversations with different groups of people, it may be difficult for a user to monitor each conversation. This can be particularly difficult when a user has several topics within each chat thread. When managing many message threads, users can become unaware of the different topics being discussed, and miss important content and tasks.

The aforementioned shortcomings, and others, can lead to an inefficient user interaction model and lead to inefficient use of computing systems. If users miss salient information within a conversation, that causes users to produce redundant messages, prolonged meetings or other duplicated efforts to retrieve and review missed content, which can lead to redundant use of network resources, storage resources, and processing resources.

SUMMARY

The techniques disclosed herein provide a system that can coordinate user interface formats between a number of client computing devices used for communicating and displaying messages. In some configurations, the system can enhance the control of user interface formats for message threads based on device form factors. The system can generate, store, and modify a data structure that defines at least one topic limit for each client computer. The data structure can cause each client computer to display different user interface formats based on individual topic limits. The data structure causes some devices, which may have a limited viewing area, to only show a single-topic thread. The data structure also causes other devices to display multi-topic threads. Thus, for high priority topics or for devices having a limited display area, the system can cause the display of a single-topic thread pertaining to a topic to which an incoming message corresponds. This feature can improve user interaction by bringing focus to high priority threads when messages of a particular topic are received at select devices, while allowing other devices to provide a broader perspective of thread formats having multiple topics when the same messages are received.

The topic limits associated with individual computers or users can be based on one or more factors. For instance, in some configurations, the topic limit can be based on the capabilities of an individual device. One example of a capability contributing to the topic limit includes the size of a display screen or a number of display screens. When a display area or a number of screens are above or below a threshold, a topic limit may be increased or decreased. In another example, a factor contributing to the topic limit can include software capabilities or hardware capabilities. For instance, some devices may only have a threshold level of processing resources, memory resources, or application features. When processing resources, memory resources, or application resources are above or below a threshold, a topic limit may be increased or decreased. Similarly, a device type can contribute to a topic limit.

In one illustrative example, a system may select a higher topic limit for a desktop computer and select a lower topic limit for a mobile device. In yet another example, a phone may be assigned a topic limit per thread at a value of one, which causes a display of a single-topic user interface format for an incoming message. The system may also assign a desktop a topic limit per thread at a value greater than one, which causes a display of a multi-topic user interface format when those devices receive the same incoming message. For instance, if a particular computing device has a topic limit of two, a single message thread displayed in a user interface can display a grouping of messages that are associated with up to two topics.

The topic limit can define a maximum number of topics that can be displayed per thread. In addition, the topic limit may also only apply to threads having specific topics. For example, a user can designate a topic limit to a particular thread having a topic, such as "Hiring." This allows the user to view a thread with multiple topics but limit the number of topics for threads having that topic. When new messages are received for that topic, the thread can be displayed in, or moved to, a viewing area when a message for that topic is received. For topics having a high priority, the system may also designate that select topic with a topic limit of one, which can cause a system to bring focus, e.g., highlight or enhance the view of a particular thread, when messages are received for that select topic. This mechanism also allows the computer to hide or close other threads pertaining to other topics, when messages are received for the select topic.

The techniques disclosed herein can provide a number of technical benefits. For instance, by providing a display of messages that are organized in individual threads having a topic limit, a computing device can effectively display information in a format that can allow a granular level of control of how content is organized. In addition, by allowing a system to display messages that are organized in individual threads having a topic limit, the system can more accurately identify topics and sort messages that are appropriate for each topic. Without the ability to limit topics within a thread, systems may display multi-topic threads making it difficult for users to see salient messages. Some existing systems do not allow for a granular level of accuracy when brining focus to salient messages. These issues with existing systems also lead to a duplicative use of computing resources for storing some multi-topic messages in multiple threads.

The disclosed system can also increase the efficiency of a user's interaction with a device. When information is organized more accurately a user is less likely to miss salient information. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The efficiencies of the analysis of a select message can also lead to other efficiencies. In particular, by displaying messages more accurately within certain threads having a particular format and a topic limit, a system can reduce the number of times a user needs to interact with a computing device to obtain information. This can lead to the reduction of manual data entry that needs to be performed by a user.

By reducing the need for manual entry, inadvertent inputs and human error can be reduced. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following disclosure provides a number of technical effects. In one example, by providing a display of messages that are organized according to a topic limit per thread, a computing device can effectively and more accurately display information in a format that can allow a granular level of control of how content is organized. This allows a system to display more accurate associations between messages and topics and bring focus to high priority messages and topics as messages are received. In one illustrative example, by providing a display of messages that are organized according to a topic limit per thread, the system can more accurately identify topics and organize messages that are appropriate for each topic. Without the ability to display messages that are organized according to a topic limit per thread, users may miss messages in situations where they have a number of open threads or a situation where they are using old user interface formats that cannot control a number of topics per thread on a per device basis. Prior systems do not provide the benefit that allow a single user to have multiple devices that each have different user interface formats based on the device form factor. If user sees the same format on each device, it may be difficult for that user to identify salient information or it may take longer to find that salient information. Whether information is missed due to a lack of organization or a system causes a user to spend more time finding that information, prior systems do not provide optimal use of computing resources. The techniques disclosed herein provide a number of technical benefits that can reduce redundant requests for information that is missed when messages are accurately not organized with topic threads. Among other technical effects, the improved user interactions disclosed herein lead to more efficient use of computing resources such as memory usage, network usage, processing resources.

Figure 1:
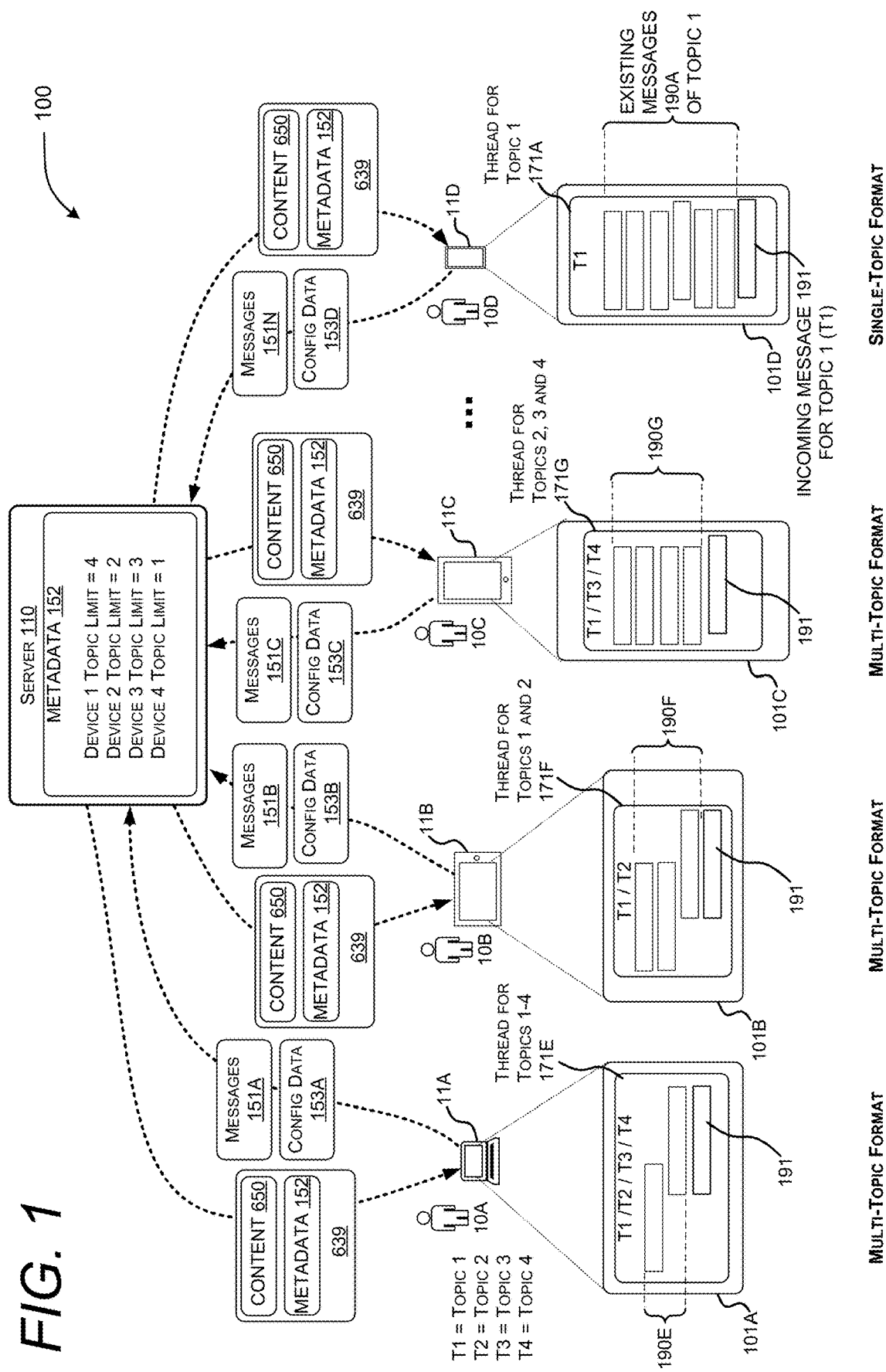
FIG. 1 is a block diagram of a system that can coordinate user interface formats between a number of client devices configured to communicate and displaying messages.

Referring to FIG. 1, aspects of a system 100 are shown and described below. In this example, the system includes individual computing devices 11 and a server 110 configured to exchange messages 151. Individual users 10 are associated with individual computing devices 11 and each computing device 11 can display a user interface 101. In this example, a first user interface 101A is displayed on a screen of a first computing device 11A for a first user 10A. A second user interface 101B is displayed on a screen of a second computing device 11B for a second user 10B. A third user interface 101B is displayed on a screen of a third computing device 11C for a third user 10C, and fourth user interface 101D is displayed on a screen of a fourth computing device 11D for a fourth user 10D.

The server stores metadata 152, also referred to herein as a data structure 152, which defines one or more topic limits for each device 11. In some configurations, a topic limit controls the number of topics that can be displayed within a single message thread for an individual device. In the example of FIG. 1, the metadata 152 defines a first topic limit for the first computing device 11. For illustrative purposes, the topic limit for the first device 11A is four (4), the topic limit for the second device 11B is two (2), the topic limit for the third device 11C is three (3), and the topic limit for the fourth device 11D is one (1). The topic limit can be selected based on a number of different factors. For instance, in some configurations, the topic limit can be based on the capabilities of an individual device. One example factor contributing to the topic limit includes the size of a display screen or a number of display screens. When a display area or a number of screens is limited, a topic limit may be increased or decreased. In another example, a factor contributing to the topic limit can include software capabilities or hardware capabilities. For instance, some devices may only have a threshold level of processing resources or memory resources. When processing resources or memory resources are limited, a topic limit may be increased or decreased. Similarly, a factor contributing to a topic limit can include a device type. In one illustrative example, if a system determines that a device type is a desktop computer the system may select a higher topic limit versus a topic limit for a mobile device.

In some configurations, the server 110 can transmit communication data 639 to each client device 10. The communication data 639 can comprise aspects of the metadata 152 and content 650. The content 650 can include a number of messages and other data associating each message with a particular topic. The communication data 639 can cause each client device to display a particular user interface format that limits the number of topics per thread based on the metadata 152 and arranges the messages in threads according to topics.

Also shown in FIG. 1, each client can also return messages 151 that are generated by each device. Thus, when a user sends a message, the server 110 can associate those messages with individual threads using the metadata 152 and deliver those messages to each device configured to display a thread associated with a topic to which those messages to which each message corresponds. The clients can also communicate configuration data 153 to the server 110 to allow the server to determine a topic limit for each device. The configuration data 153 can indicate one or more capabilities of each device to allow the server to determine a topic limit for each device 11 and/or each user. For instance, the configuration data 153A for the first device can indicate that the first device is a desktop computer having a screen having a first set of dimensions. The configuration data 153D for the fourth device can indicate that the fourth device is a mobile computer having a screen having a second set of dimensions. The server can then determine if those screen dimensions and/or the device types meet one or more criteria for determining a topic limit for each device. The topic limit may be lower for devices having a smaller form factor, devices having a smaller screen, or for devices having fewer capabilities.

These examples are provided for illustrative purposes and are not to be construed as limiting. It can be appreciated that a topic limit may be increased for the smaller devices depending on user preferences. For instance, a device having a larger form factor may have a reduced topic limit if a user has indicated a high priority for a particular topic or a particular thread. For threads or topics having a threshold priority level, the topic limit may be reduced to help isolate messages for a particular topic when messages of that particular topic are received. Similar factors can be applied to determine a respective topic limit for the other devices.

Given the example metadata of FIG. 1 with respective topic limits per device, the server 110 or another computer sharing the metadata 152 can coordinate each client device 11 to display different user interface formats. For instance, the first device displays a first user interface format 101A that comprises a first collection of messages 190E that are associated with a first collection of topics, e.g., a first topic (T1), a second topic (T2), a third topic (T3), and a fourth topic (T4). The second device displays a second user interface format 101B that comprises a second collection of messages 190F that are associated with a second collection of topics, e.g., the first topic (T1) and the second topic (T2), a third topic (T3), and a fourth topic (T4). The third device displays a third user interface format 101C that comprises a third collection of messages 190G that are associated with a third collection of topics, e.g., the first topic (T1), third topic (T3), and fourth topic (T4). The fourth device displays a fourth user interface format 101D that comprises a fourth collection of messages 190A that are associated with a fourth collection of topics, e.g., just the first topic (T1). When a new message 191 is received at each computer, and if the message pertains to a topic of a predetermined thread, the system can display the new message 191 within each thread. In this example, the received message 191 pertains to the first topic (T1), and thus is displayed on all four computers using the respective user interface formats configured according to the metadata 152.

The system 100 provides a way for one or more computers, such as the server, to generate, store and modify the metadata that can coordinate user interface formats for each computer. When a mobile device, for instance, receives an incoming message, that device can only display the thread to which the incoming message corresponds, but not other parallel subjects. For other users or the same user on a desktop device or larger screen device, the system can cause a display the same message in multi-topic UI format. The data structure can enable coordination on how each device displays the messages even if one user has multiple devices.

In another illustrative example, the data structure defines one or more topic limits which causes some devices to only show a single thread of a topic to which an incoming message corresponds, while other devices show a multi-topic UI format for the same incoming message. In FIG. 1, the fourth device 11D is a mobile phone which has a topic limit, e.g., 1, that causes that device to display only the thread to which the incoming message corresponds. The other devices 11A-11C have other device types or other screen sizes that may be larger than the fourth device. Based on a larger screen size, device type having a larger size, e.g., form factor, or higher capabilities, or a topic priority, the topic limit can be determined to be higher, which causes multi-topic UI format for the incoming message.

As shown in FIG. 1, in response to the configuration data 153 from each device, the server or another computer can cause a generation of metadata 152 defining a first topic limit that causes a first computing device 11D having a first display screen size or a first device type to only display a thread having a first topic to which an incoming message corresponds. The metadata 152 further defines a second topic limit that causes other computing devices 11A-11C having other display screen sizes or other device types to display a multi-topic user interface format, wherein the multi-topic user interface format comprises messages corresponding to at least one topic to which the incoming message corresponds.

When a new message is received by the mobile device, the fourth client 11D of FIG. 1, that device only displays the thread to which the incoming message corresponds. In some configurations, the system causes the first computing device 11D to utilize the first topic limit of the metadata 152 to render a first user interface format 101D that only displays the thread 171A having messages 190A pertaining to the first topic to which the incoming message 191 corresponds. The rendering of the first user interface format 101D concurrently displays the incoming message 191 with the messages 190A of the first topic.

For the other devices, which in this example are desktop computers and tablets, e.g., the first three devices 11A-11C of FIG. 1, each device can display a multi-topic UI format for the incoming message. In some configurations, the system causes the other computing devices 11A-11C to utilize the second topic limit of the metadata 152 to render other user interface formats 101A-101C that displays multi-topic threads 171E-171G having messages 190E-190G pertaining to topics to which the incoming message 191 corresponds. The rendering of the other user interface formats 101A-101C concurrently displays the incoming message 191 with the messages 190 of the topics.

Figure 2:
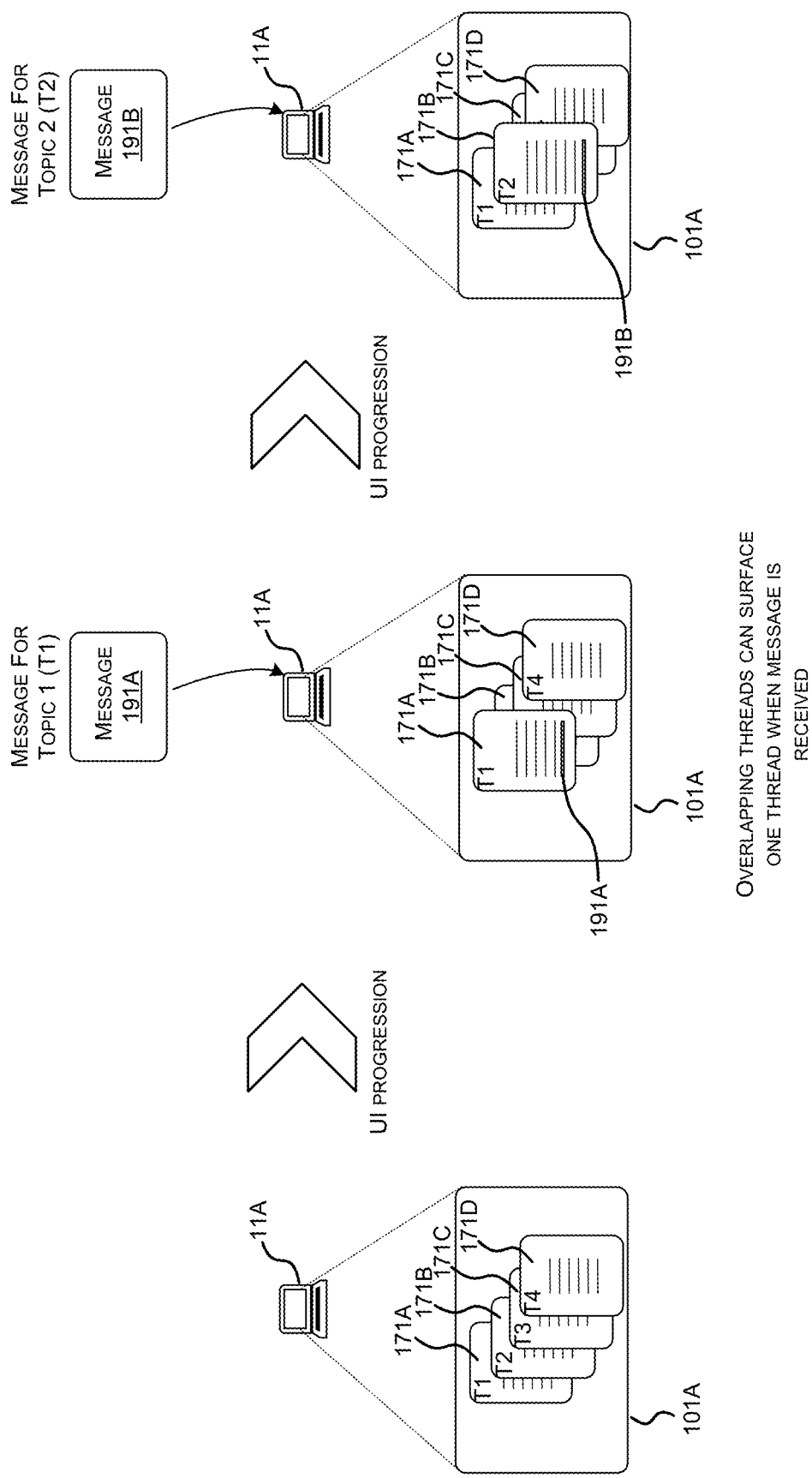
FIG. 2 shows a series of user interface transitions that may occur when a message is received for a thread having a topic limit of one.

FIG. 2 shows a series of user interface transitions that may occur when a message is received for a thread having a topic limit of one. In this example, the computer has several threads 171 each having one topic per thread limit based on the metadata 152. This example, each thread 171 is initially arranged in an overlapping manner. During a first state, shown on the left side of FIG. 2, a first thread 171A is arranged partially behind a second thread 171B, which is arranged partially behind a third thread 171C, which is arranged partially behind fourth thread 171D. When the system receives a message 191A pertaining to the first topic (T1) that is associated with the first thread 171A, the system can cause the first thread 171A to be displayed in a manner that removes any obstructions to the first thread. In the example shown in the center of FIG. 2, when the message 191A is received, the first thread 171A can move from a position that obscures at least a portion of the first thread to a position where the first thread is not obscured or covered. In some configurations, this state in the transition can cause the first thread to be displayed in front of other threads or may cause the other threads to close or be minimized.

When the system receives another message 191B pertaining to the second topic (T2) that is associated with the second thread 171B, the system can cause the second thread 171A to be displayed in a manner that removes any obstructions to that thread. In the example shown in the right side of FIG. 2, when the other message 191B is received, the second thread 171B can move from a position that obscures at least a portion of the second thread to a position where the second thread is not obscured or covered.

In some configurations, this state in the transition can cause the second thread, or a viewing area or window of the second thread, to be displayed in front of other threads, which may cause the other threads to close or be minimized. This example may include operations for displaying a first user interface format comprising a number of threads each pertaining to individual topics. When messages are received for a particular topic pertaining to an associated thread, the first user interface format transitions to a state only displaying the single thread having messages of the first topic after receipt of the incoming message related to the first topic.

Figure 3:
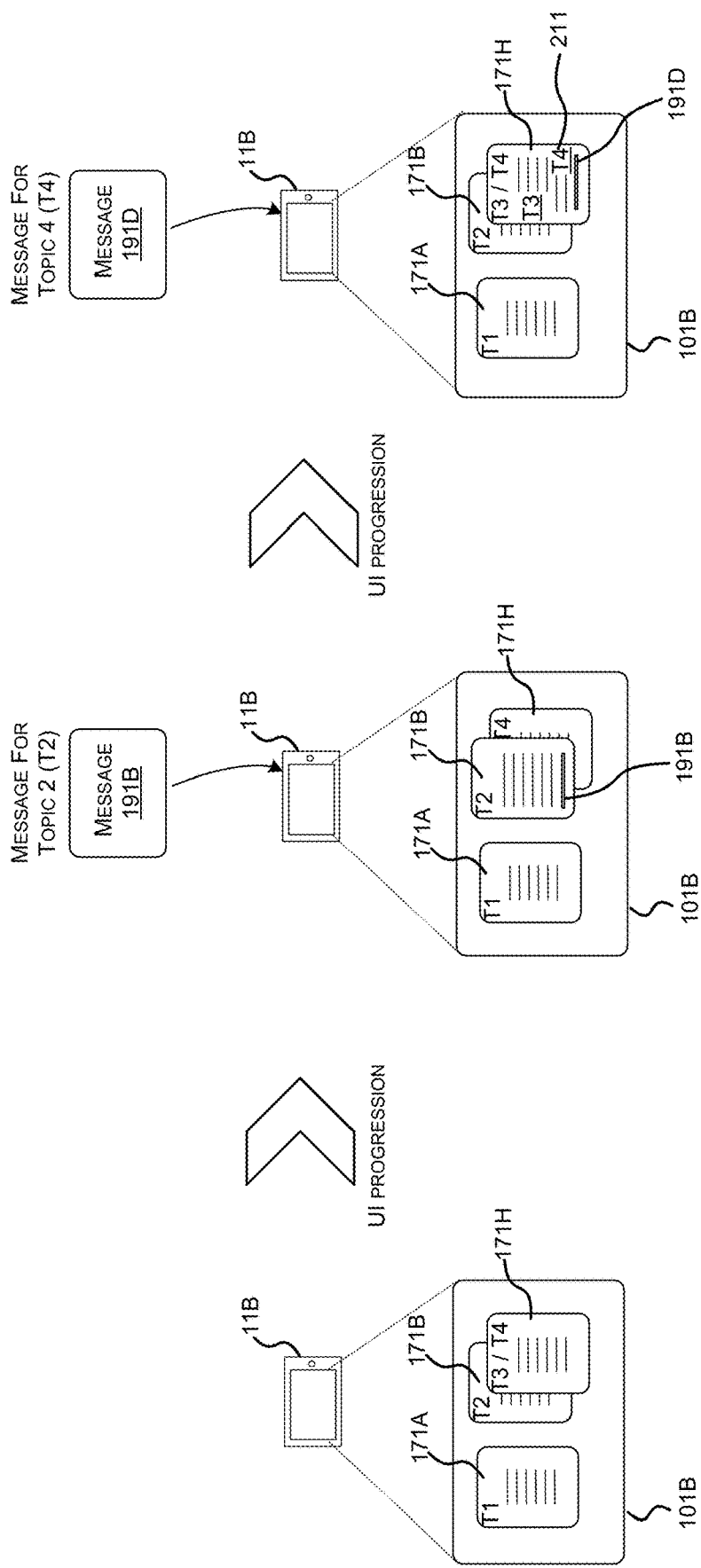
FIG. 3 shows a series of user interface transitions that may occur when a message is received for a thread having a topic limit of three.

FIG. 3 shows a series of user interface transitions that may occur when a message is received for a thread having a topic limit of three with other threads having a topic limit of one. In this example, one device and/or a user is associated with metadata that defines a topic limit one for a first thread 171A for displaying message of a first topic (T1), a topic limit of one for a second thread 171B for displaying message of a second topic (T2), and a topic limit of two for a third thread 171H for displaying message of a third topic (T3) and fourth topic (T4). Based on metadata defining these topic limits, a user interface 101B contains some threads 171 that are initially arranged in an overlapping manner. During a first state, shown on the left side of FIG. 3, a first thread 171A configured to display messages of the first topic is arranged on the left side of the user interface, the second thread 171B configured to display messages of the second topic is arranged partially behind a third thread 171C configured to display messages of the third topic and fourth topic. When the system receives a message 191B pertaining to the second topic (T2) that is associated with the second thread 171B, the system can cause the second thread 171B to be displayed in a manner that removes any obstructions to the second thread. In the example shown in the center of FIG. 3, when the message 191B is received, the second thread 171B can move from a position that obscures at least a portion of the second thread to a position where the second thread is not obscured or covered. In some configurations, this state in the transition can cause the second thread to be displayed in front of other threads or may cause the other threads to close or be minimized.

In this example, the first thread may be arranged separately if the topic of the first thread one or more criteria e.g., exceeds a priority threshold. Thus, the user interface is configured to restrict the movement of the second thread or the third thread such that those threads cannot be moved to obscure even a portion of the first thread. Thus, when a message is received for the first thread, the user can readily identify that incoming message related to the first topic (T1).

When the system receives a message 191D pertaining to the third topic (T3) or the fourth topic (T4), which are associated with the third thread 171H, the system can cause the third thread 171H to be displayed in a manner that removes any obstructions to the third thread. In the example shown in the right side of FIG. 3, when the message 191D is received, the third thread 171H can move from a position that obscures at least a portion of the third thread 171H to a position where the third thread 171H is not obscured or covered. In some configurations, this state in the transition can cause the third thread 171H to be displayed in front of other threads or may cause the other threads to close or be minimized. In any of the disclosed embodiments, a topic limit may be applied to a select thread while other threads have other topic limits. This allows for automatic generation of a user interface format that brings emphasis to certain threads by having lower topic limits in select threads. Also, in some embodiments, some devices can have a fixed position for a particular thread (T1) while other threads can move or transition to show different layers of a user interface to rotate through the threads in a display, as shown in FIG. 3. This allows a system to highlight specific threads having high priority topics while also allowing a device to show some threads having multiple topics.

Figure 4:
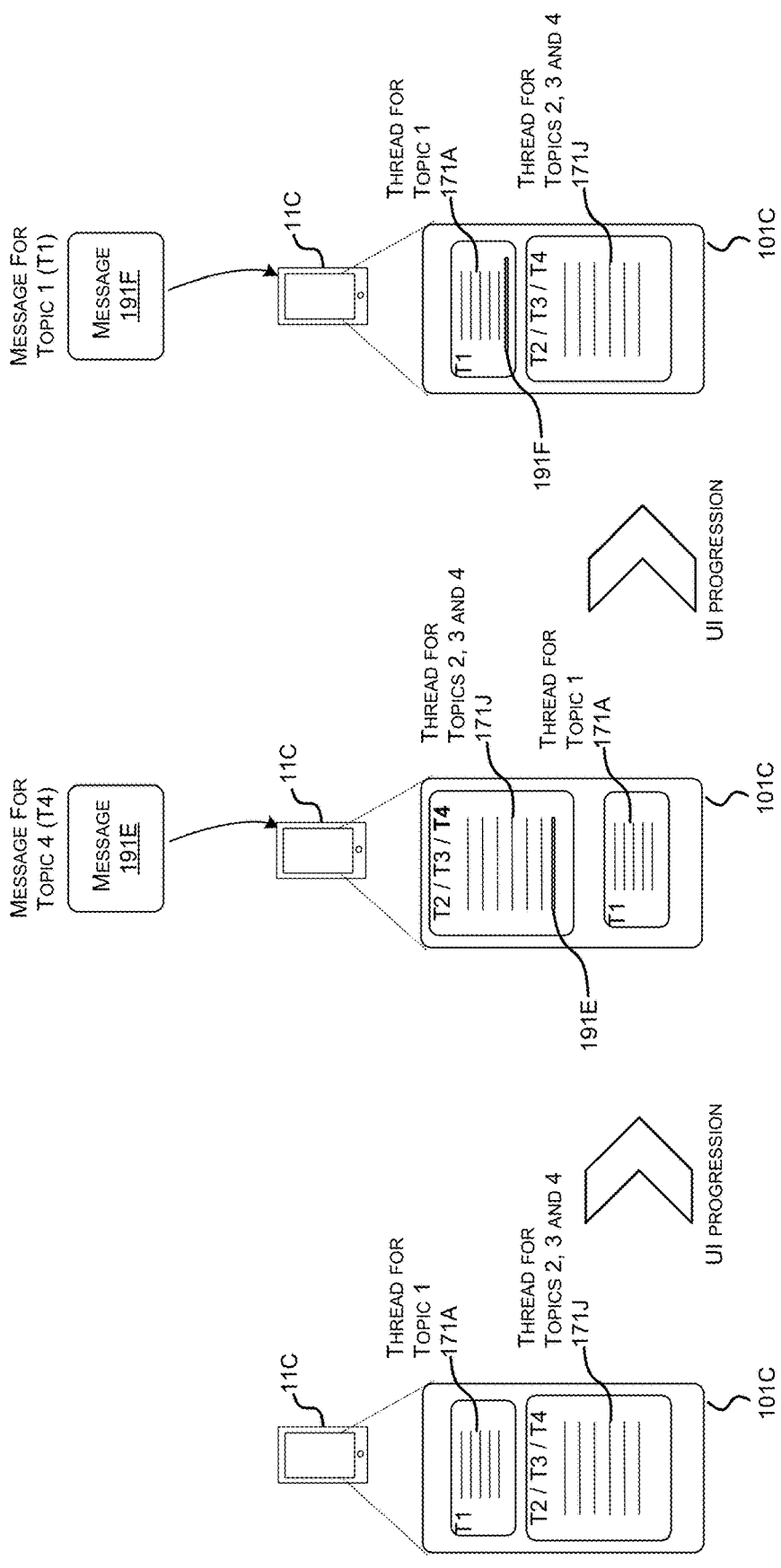
FIG. 4 shows a series of user interface transitions that may occur when a message is received for a thread having a topic limit of one, and when another message is received for another thread having a topic limit of more than one.

FIG. 4 shows a series of user interface transitions that may occur when a message is received for a thread having a topic limit of one, and when another message is received for another thread having a topic limit of more than one. In this example, one device and/or a user is associated with metadata that defines a topic limit one for a first thread 171A, a topic limit of three for a second thread 171J. In this example, each thread has a particular position relative to one another. In a first state, shown on the left side of FIG. 4, the first thread 171A configured to display messages of the first topic is arranged on the top of the user interface, above the second thread 171J. When the system receives a message 191E pertaining to the second topic (T2), as shown in the center of FIG. 4, third topic (T3) or the fourth topic (T4), both of which are associated with the second thread 171J, the system can cause the second thread 171J to move to a more prominent location within the user interface 101C. In this case, the second thread 171J is repositioned to the top of the user interface and also in response to the receipt of the message 191E, the first thread 171A is moved to the bottom of the user interface. This example is provided for illustrative purposes and is not to be construed as limiting. It can be appreciated that any other location can be identified as a prominent or preferred location and a thread having multiple topics to that predetermined location when a message is received for that multi-topic thread.

When the system receives another message 191A pertaining to the first topic (T1), as shown on the right side of FIG. 4, the system can cause the first thread 171A to move to the predetermined location of the user interface. In this example, the predetermined location is the top half of the user interface. Thus, the first thread is moved to the predetermined location and the other thread, the second thread 171J, is moved from the predetermined location to another location, such as the bottom half of the user interface.

Figure 5A:
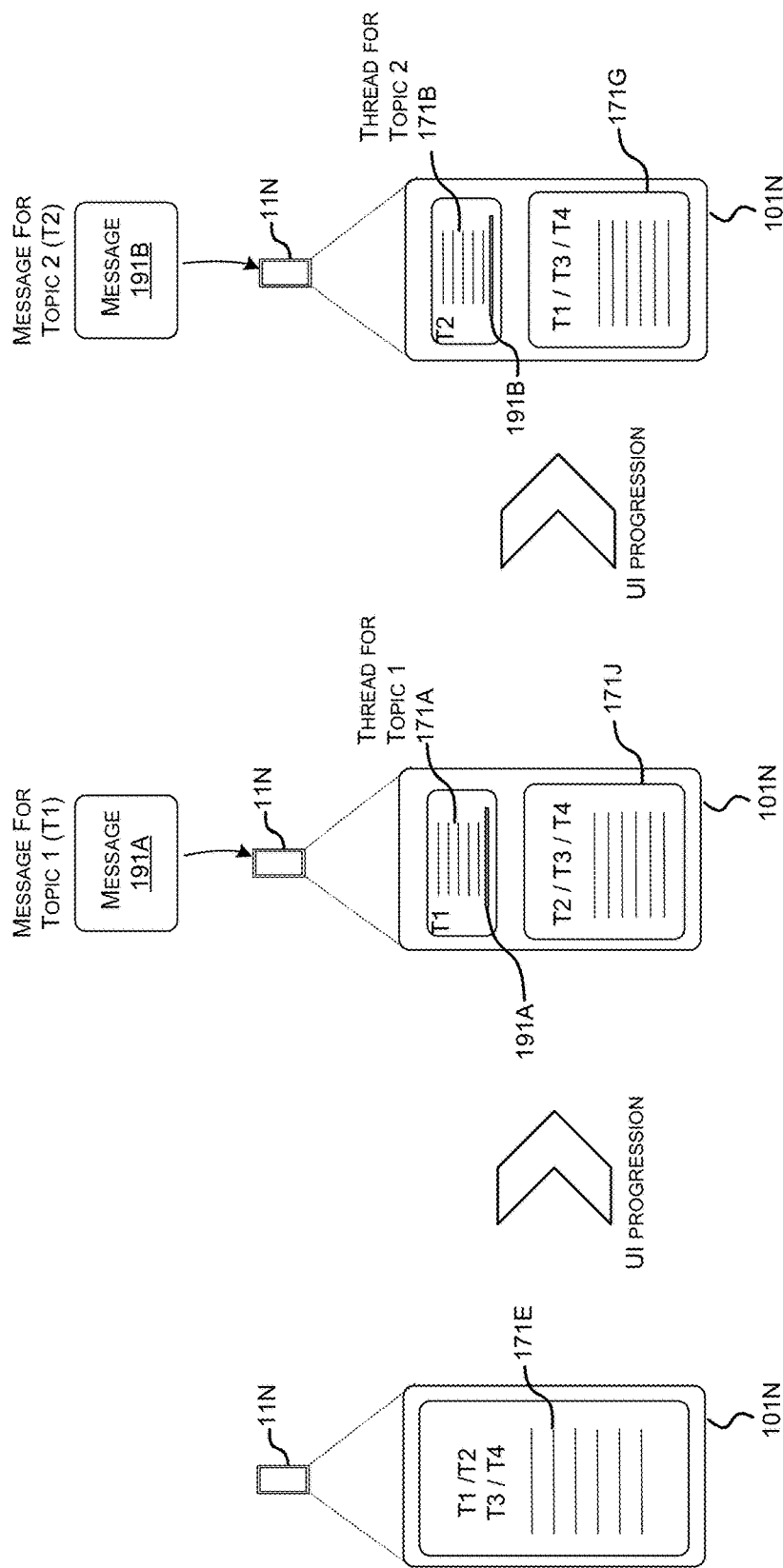
FIG. 5A shows a series of user interface transitions for a multi-topic thread that can be split into child threads when a message is received for a particular topic.

FIG. 5A shows a series of user interface transitions for a multi-topic thread that can be split into child threads when a message is received for a particular topic. In this example, given the metadata defining a topic limit of four, as shown on the left side of FIG. 5A, an initial thread 171E displayed with a group of messages that pertain to a number of topics, e.g., a first topic through a fourth topic. It can be appreciated that the topic limit of four can mean that a thread can comprise any number of topics up to the limit, e.g., this thread 171E can include messages pertaining to a single topic, two topics, three topics or four topics.

In response to receiving a message pertaining to a particular topic, e.g., a first topic, the user interface 101N can transition from the state shown on the left side of FIG. 5A to the state shown in the center of FIG. 5A. In this transition, the user interface showing the multi-topic thread at a first thread limit can transition to an updated user interface showing a first child thread and a second child thread. In this example, the first child thread 171A includes messages for a first topic. The second child 171B thread includes messages for the remaining topics, e.g., the second topic through the fourth topic. This transition can occur in response to receiving a message 191A pertaining to the first topic. The transition to the updated user interface can be for a predetermined period of time or until a user provides an input. After the predetermined time or after the user input, the user interface can transition back to the state shown on the left side of FIG. 5A.

A similar transition is also shown from the user interface state in the center of FIG. 5A to the right side of FIG. 5A. In this example, while the user interface is displaying the first child thread and the second child thread, the system receives a second message 191B pertaining to the second topic. In this transition, the child threads may be modified such that a new thread 171B is generated and displayed by extracting messages pertaining to the second topic from the second child thread 171J. In addition, messages for the thread 171A for the first topic can be combined with other messages to generate a new multi-topic thread 171G. This allows the system to specifically display single topic threads when messages pertaining to those particular topics are received. Individual messages pertaining to a given topic can be extracted from a multi-topic thread to organize those messages within incoming message pertaining to that topic.

Figure 5B:
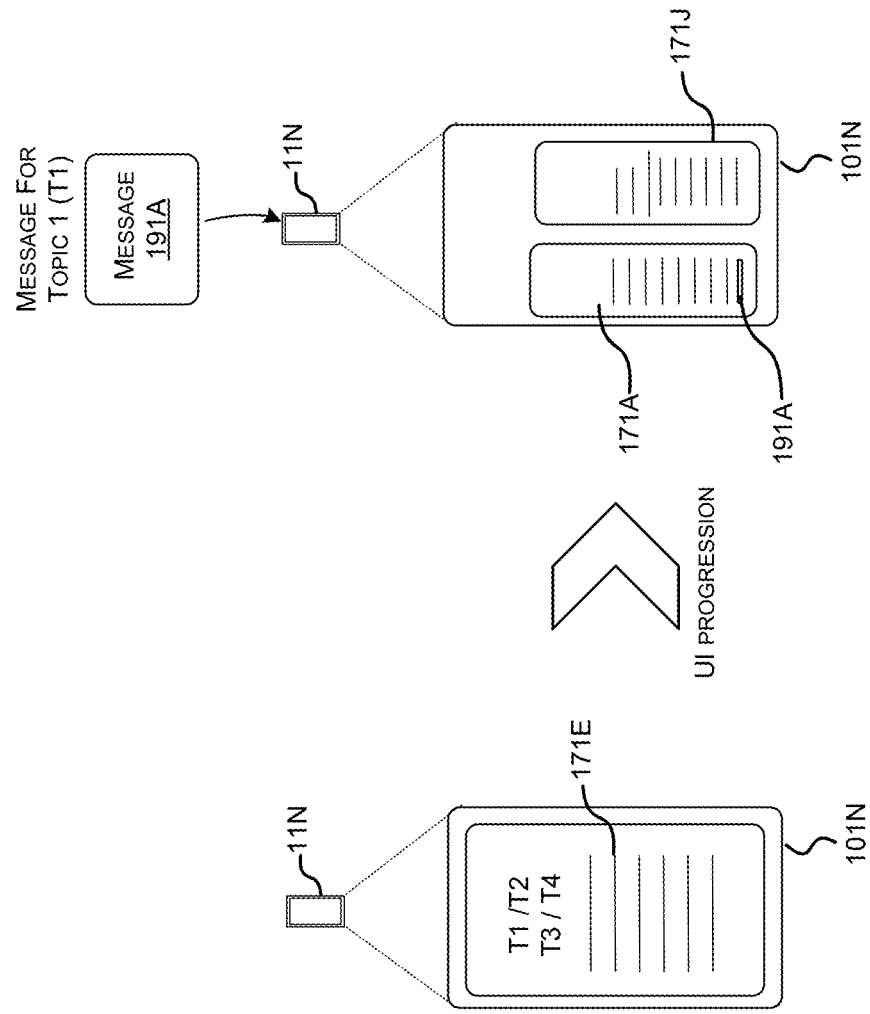
FIG. 5B shows a series of user interface transitions for a multi-topic thread that can be split into child threads when a message is received for a particular topic, this embodiment shows a horizontal split.

In some configurations, the sender or receiver can split a chat window horizontally or vertically. Both sender and receiver can have the split horizontal or vertical, or each has a different split. FIG. 5B illustrates one example of how that a thread can be split horizontally in response to a receipt of a message. The transition shown in FIG. 5B can be executed in a similar manner as described above with respect to FIG. 5A. However, in this example, the computer is configured to split the multi-topic thread into two child threads that are horizontally aligned.

Figure 5C:
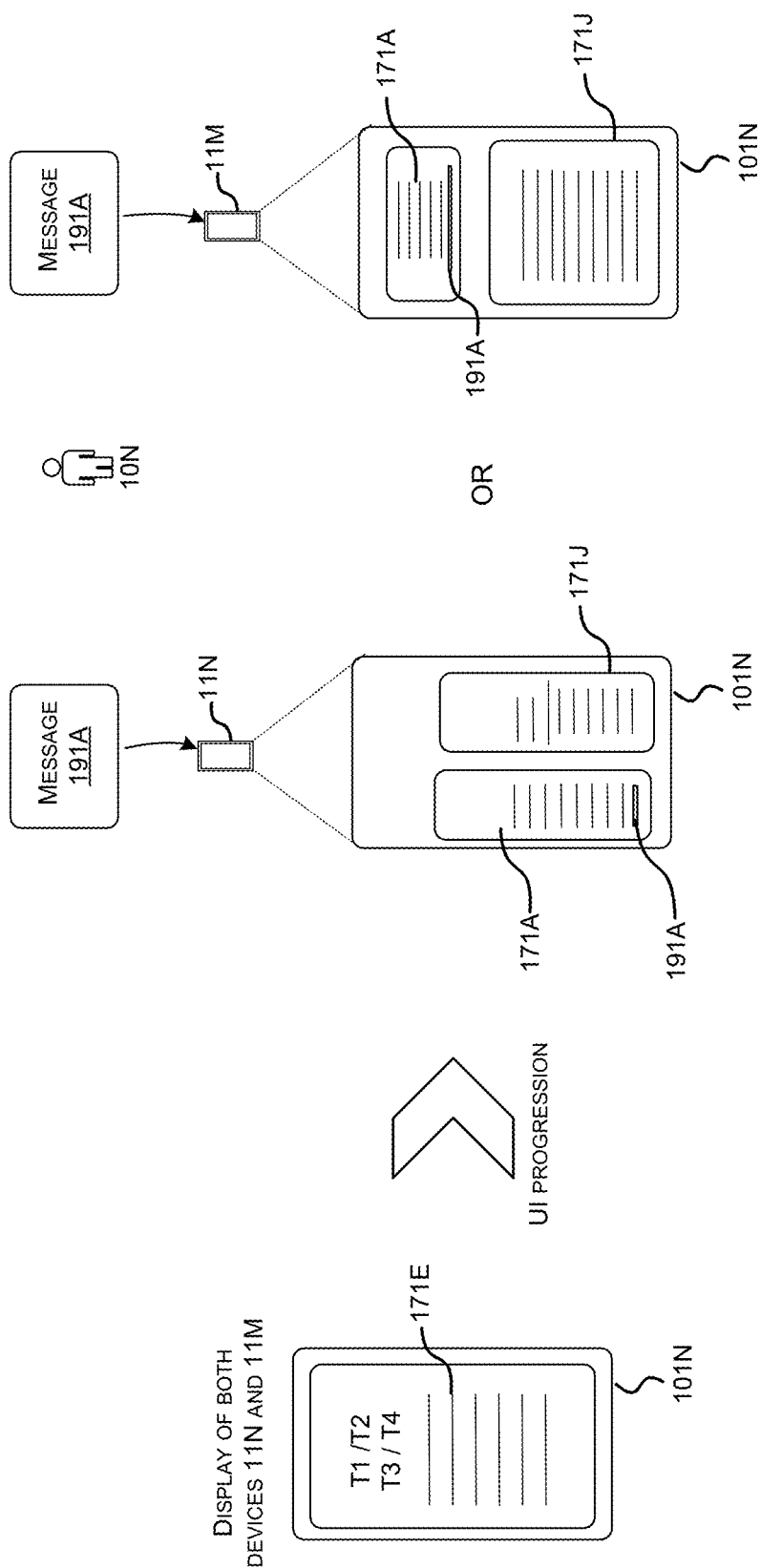
FIG. 5C shows a user interface transition for a multi-topic thread that can be split into child threads and the threads can be displayed differently on two devices of the same user.

FIG. 5C shows a scenario where a single user 10N is operating two devices 11N and 11M. In this example, both devices start with the same user interface format with a multi-topic thread, as shown on the left side of FIG. 5C. When a message is received, each device can split the multi-topic thread when a message is received. Based on the user preferences and or other factors such as a device type or screen dimensions, the threads may be split horizontally or vertically.

In some cases, such as those shown in FIGS. 5A-5C, the sender or receiver may decide to take a set of split chat threads and split them into a separate chat window. This requires the capability of having multiple instances of chat windows for the same set of participants. This can also be spread across different devices, as shown in FIG. 5C.

Figure 6:
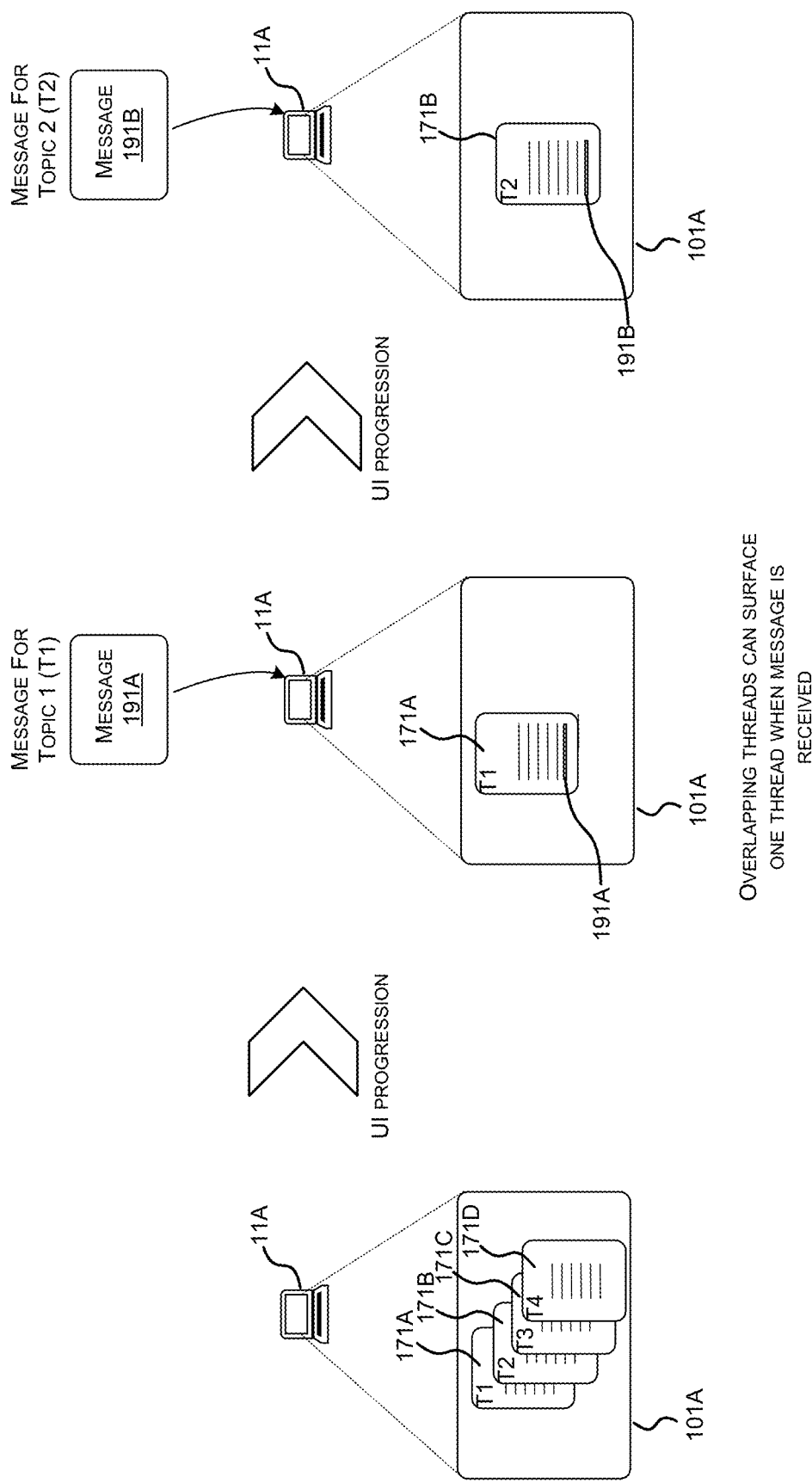
FIG. 6 shows a series of user interface transitions that may occur when a message is received for two different threads having a topic limit of one.

FIG. 6 shows a series of user interface transitions that may occur when a message is received for two different threads having a topic limit of one. This example is similar to FIG. 2, in that a number of individual threads each have a topic limit of one. The threads 171 are concurrently displayed, which can be in an overlapping manner. When a message 191A is received pertaining to a first topic, that particular thread pertaining to the first topic is displayed exclusively on the user interface 101A, as shown in the example of the center of FIG. 6. When another message 191B is received pertaining to a second topic, that particular thread pertaining to the second topic is displayed exclusively on the user interface 101A, as shown in the example of the center of FIG. 6. In this example, the threads that do not relate to a topic of the incoming message are either minimized or obscured, e.g., blurred, blocked, covered, etc.

Figure 7:
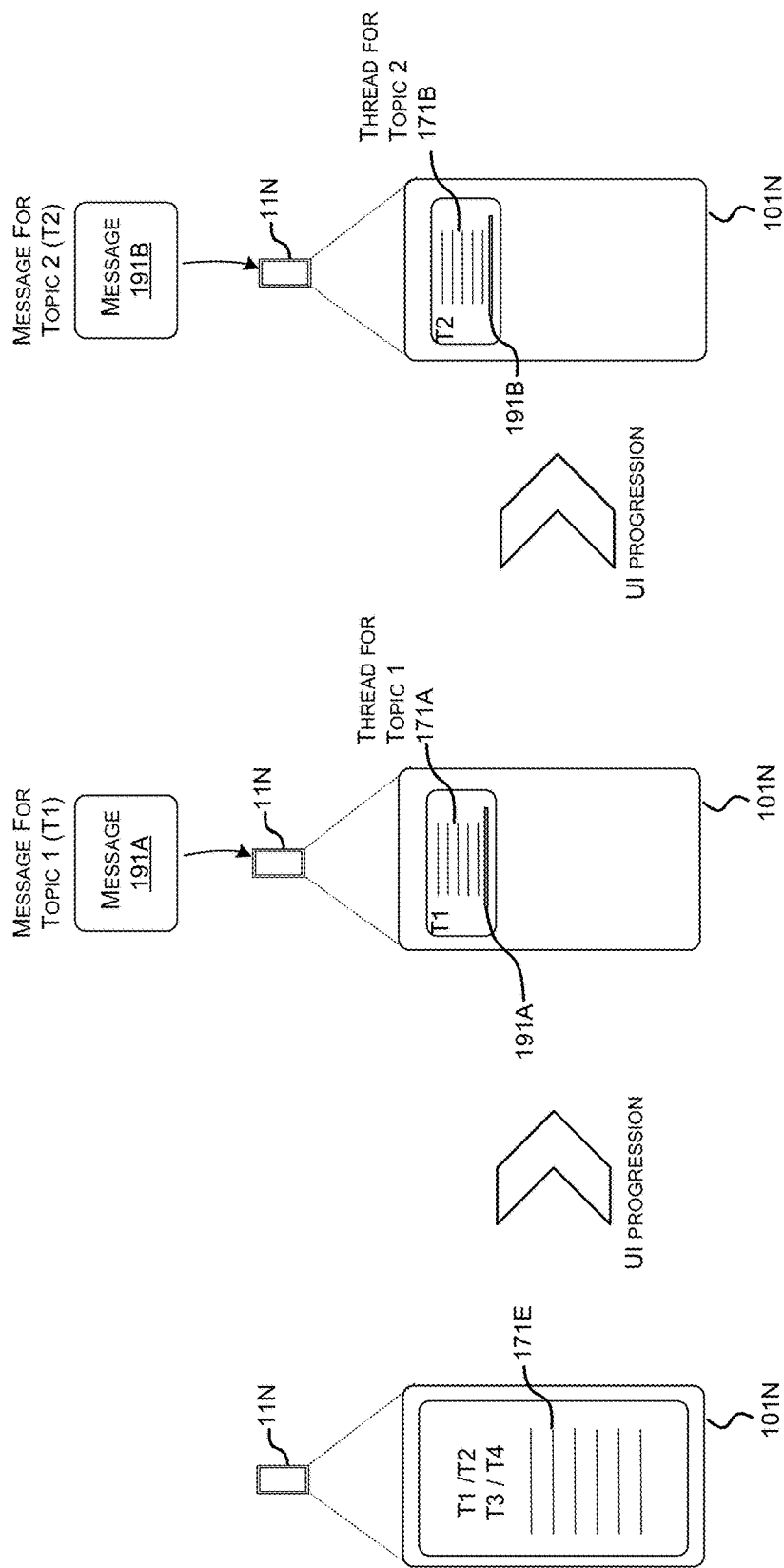
FIG. 7 shows a series of user interface transitions that may occur when a message is received for a thread having multiple topics, and to specific topics each having a topic limit of one, where messages received for each specific topic causes the generation of a new thread for that topic.

FIG. 7 shows a series of user interface transitions that may occur when a message is received for a thread having multiple topics, and to specific topics each having a topic limit of one, where messages received for each specific topic causes the generation of a new thread for that topic. This example shows a series of user interface transitions for a multi-topic thread that can be split into child threads when a message is received for a particular topic. In this example, given the metadata defining a topic limit of four, as shown on the left side of FIG. 7, an initial thread 171E displayed with a group of messages that pertain to a number of topics, e.g., a first topic through a fourth topic. It can be appreciated that the topic limit of four can mean that a thread can comprise any number of topics up to the limit, e.g., this thread 171E can include messages pertaining to a single topic, two topics, three topics or four topics.

In response to receiving a message pertaining to a particular topic, e.g., a first topic, the user interface 101N can transition from the state shown on the left side of FIG. 7 to the state shown in the center of FIG. 7. In this transition, the user interface showing the multi-topic thread at a first thread limit can transition to an updated user interface showing a first child thread. In this example, the first child thread 171A includes messages for a first topic. This transition can occur in response to receiving a message 191A pertaining to the first topic. The transition to the updated user interface can be for a predetermined period of time or until a user provides an input. After the predetermined time or after the user input, the user interface can transition back to the state shown on the left side of FIG. 7. In this example, a second message 191B pertaining to the second topic is received before the user interface can transition back to the state shown on the left side of FIG. 7. In this scenario, the user interface can transition from the state the thread 171A to another state that exclusively shows the second thread 171B in response to receiving the message 191B pertaining to the second topic.

These examples are provided for illustrative purposes and are not to be construed as limiting. It can be appreciated that a number of different transitions can occur that generate single-topic threads from multi-topic threads to bring highlight to particular messages pertaining to a topic related to an incoming message. It can also be appreciated that user interface arrangements can be modified when an incoming message is received for a particular topic such that a user interface can bring highlight to or move a particular thread to a predetermined location to draw a user's attention to a particular topic pertaining to an incoming message.

In some configurations, a sender or receiver can choose to hide different chat windows on different devices. For instance, when a sender is working from both a desktop and a laptop and that user sends a message, the computing devices of the recipients see the same user interface formats according to the topic limits of their computers. However, the computing device of the sender can display different UI splits on his or her two computers. Thus, a first user may view the transitions shown in FIG. 6 on a home computer and yet have a work computer show the transitions shown in FIG. 4. This example is for illustrative purposes and is not to be construed as limiting. It can be appreciated that any single user can utilize any number of computers can independently utilize any of the transitions described herein using any suitable topic limit.

Figure 8A:
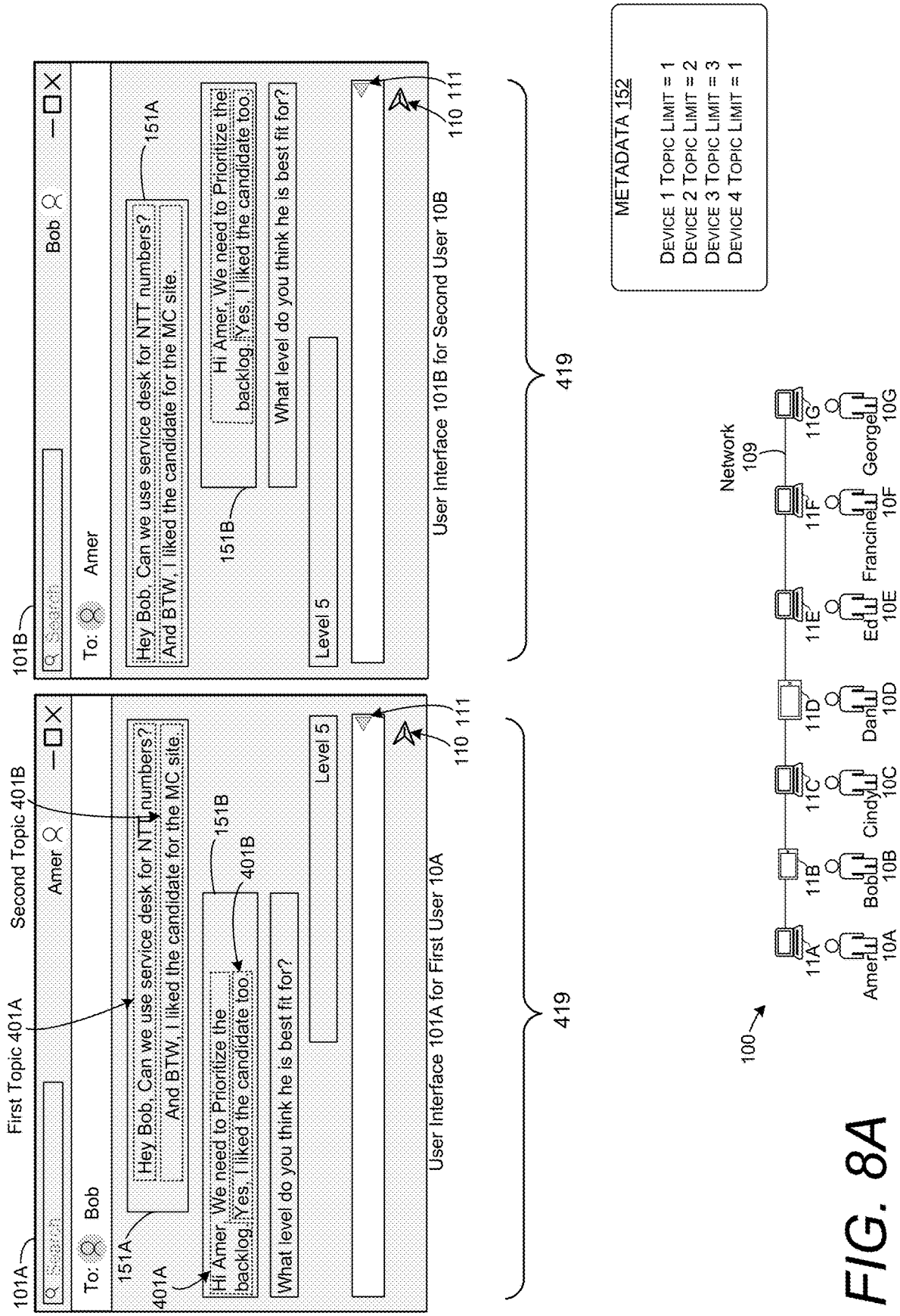
FIG. 8A shows a user interface showing an original thread having multiple topics and individual messages having multiple topics.
Figure 8B:
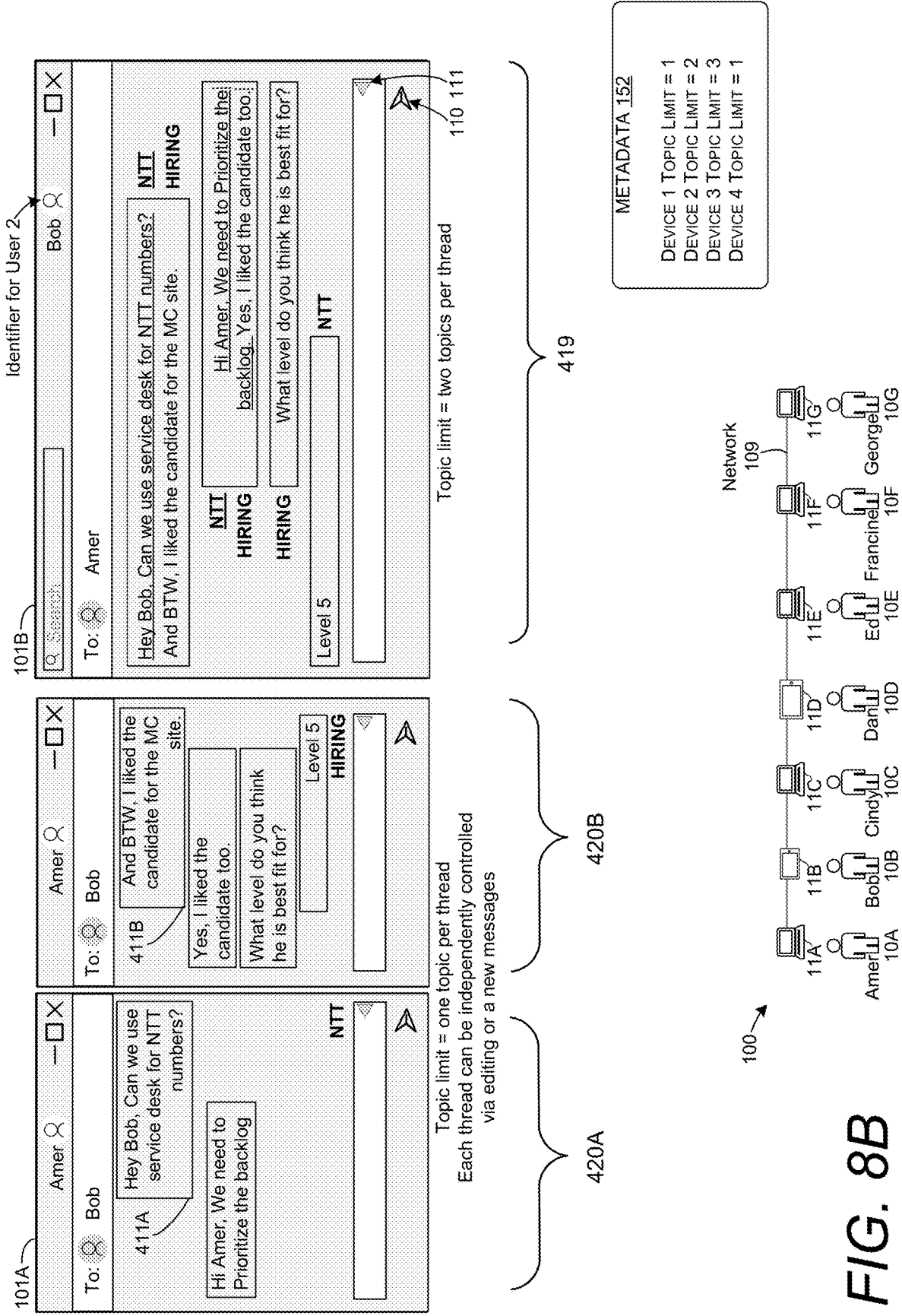
FIG. 8B shows a user interface showing the division of a thread based on a topic limit for two different computers of a first user and a second user.

FIG. 8A-8B illustrate a number of user interface transitions showing how individual messages within a thread can be split when child threads are generated. FIG. 8A shows a first user interface format of a first computer having multiple topics within the thread, an individual messages within the thread pertaining to two different topics. The left side of FIG. 8B shows a second user interface format that may be generated when the multi-topic thread of FIG. 8A is split into two different threads. This may occur when a device transitions from a topic limit of two to a topic limit of one. The right side of FIG. 8B shows a user interface format 101B of a second computer showing a multi-topic thread that is maintained when a message is received for a related topic.

FIGS. 8A and 8B show a process where a computer splits a thread. In this example, the first user 10A and the second user 10B are using their respective computers to send messages to one another. As shown in FIG. 8A, an original thread 419 comprises a set of messages 151. The system activates a split of the original thread 419 to generate two child threads 420 shown in left side of FIG. 8B. The child threads 420 can include messages 411 having text content from a multi-topic message of the original thread 419, such the first message 151A. As shown, the first message 151A has text content pertaining to multiple topics 401, e.g., a first section of text pertaining to a first topic 401A, e.g., NTT numbers, and a second section of text pertaining to a second topic 401B, e.g., hiring.

In one of the initial stages of a process of splitting a message, as shown in FIG. 8A, the system can cause the first computer 11A to display a user interface 101A comprising an original thread 419 of a plurality of messages 151. A first message 151A from the original thread can include text content. In some configurations, the system can analyze the text content of a select message, such as the first message 151A, of the original thread 419 determine if the select message has multiple topics. The analysis of the select message may be initiated by an automatic selection of a message based on the criteria disclosed herein. Alternatively, the analysis of the select message may be initiated by an input at a user interface element 111 by any participant. The analysis can be initiated while a message is being composed in a text entry filed, e.g., before the user provides an input at a send button 110, or the analysis can be initiated after all messages are sent to a thread.

The system can determine if a single message has multiple topics by identifying at least a first topic 401A and a second topic 401B within the text content of the select message of the messages 151 of the original thread 419. For illustrative purposes, in this example, a first text portion of a select message, e.g., the first message 151A, of the original thread 119 is associated with the first topic 401A and a second text portion of the select message is associated with the second topic 401B.

The analysis of the text to determine topics within a message can be based on any suitable technology. In some configurations, the analysis to determine topics within a message can be based on the presence of predetermined words or predetermined word combinations that are in a single message. In some configurations, the analysis to determine topics within a message can also be based on the presence of word categories. In one illustrative example, predetermined nouns or verbs found within a message can be identified as a topic candidate. Predetermined words can also include categories of words like team names, product names, etc. Thus, any of the predetermined words, which may be retrieved from a database, can be used to identify topics within a message. Text in a predetermined format can also be selected as a topic candidate. For example, words in all cap characters or words in bold text may be selected as a topic candidate.

In some configurations, predetermined keywords that are found within a select message can be identified as a topic candidate. Keywords can be stored in a database and aligned with, or labeled as, a topic. The database can also maintain scores for each keyword and/or topic. When a keyword is identified in a message, a topic candidate can be selected. Topic candidates can also be selected using the other techniques disclosed herein. The topic candidates can be scored and ranked, and topic candidates having a threshold score, e.g., a threshold priority, can be selected as a topic for a child thread.

The system can also select text portions of a message and associate each portion with a particular topic. The text portions may be selected based on punctuation, text spacing, or the position of some text characters. In the example of FIG. 8A, based on the punctuation, the system can determine that there are two sentences. Each sentence can be analyzed to derive a topic candidate for each portion of text. For illustrative purposes, consider a scenario where the text is analyzed, and the system determines that the first sentence within the select message 151A pertains to a first topic 401A and a second sentence within the select message 151A pertains to a second topic 401B. In such an example, certain keywords, such as the subject of a phrase can be selected as a topic candidate, such as NTT, for the first topic 401A. In another example, a topic candidate can be selected from a list of topics that are associated with keywords. In such an example, the system can identify one or more keywords within a message, such as "candidate," and automatically select a topic candidate, such as "hiring," based on that keyword. If the topic candidate meets one or more criteria, such as a topic candidate having a priority threshold, that type of topic candidate can be selected as a topic for a new thread. This example is provided for illustrative purposes and is not to be construed as limiting. It can be appreciated that any suitable technology for identifying a topic within a collection of text can be utilized with the techniques disclosed herein.

If the system determines that two topic candidates of a single message are related, e.g., the topic candidates are the same or they are synonymous to a threshold degree, the system may determine that the associated message is a single-topic message. Such a determination can be made by scoring each topic candidate. For example, if a select message has a first portion, e.g., a first sentence, with the word "candidate" and another portion with the word "resume," a first score can be associated with a word such as "candidate" and another score can be associated another word such as "resume." These scores may indicate a threshold level of likeness given that they are both related to hiring. Thus, when a system detects a message having two portions with these two keywords having a threshold level of likeness, the system may not generate new child threads.

When a system detects a message having two portions with two keywords, and corresponding topic candidates that do not have a threshold level of likeness, the system may generate new child threads for each topic candidate. For example, a word in a first portion of a message, such as "NTT," may be associated with a first score and another word in a second portion of the message, such as "candidate," may be associated with a second score. These scores may not indicate a threshold level of likeness given that they are not related to a similar topic. Thus, a message having two portions with these two words that do not have a threshold level of likeness may be deemed as a multi-topic message. Once a single message is deemed to be a multi-topic message, the system can invoke one or more operations for splitting that message into two or more child threads as well as organizing other messages of the original thread into individual child threads.

In some embodiments, a system can also select one or more messages within the original thread 419 for analysis. Thus, the system may only analyze select messages meeting one or more criteria. By limiting the number of messages that are analyzed to detect multiple topics, a system may introduce further efficiencies with respect to computing resources. In one example, the system may only select messages having multiple sentences or multiple phrases. In such an example, any message having more than one sentence can be selected for analysis. In another example, the system may select messages that have more than a threshold number of words or characters. In such an example, only messages having more than a threshold number of words or threshold number of characters can be selected for analysis. In other examples, a system may select a message for analysis based on the position of the message within a user interface. This may include a position of a message within a thread or a viewing area, e.g., the last message of a thread or a message that is at the top of a viewing area, may only be selected for analysis. In yet another example, a system may select a message for analysis based on a timestamp or a state associated with the message. In such an example, a most recently received message may be selected for analysis, or a system may only select a message that is recently composed but not sent, etc. In other examples, a system may only select messages that have been received within a predetermined time period, or a system may only select message that have been received outside of a predetermined time period.

Other characteristics of a message, such as a format, can be used to select a message for analysis. This may include a font type, a threshold number of capital letters, threshold number of capital letters per word, or formatting combinations, e.g., a threshold number of characters in bold text, etc. Once a message is selected for analysis, the system determines if the message contains multiple topics. These examples are provided for illustrative purposes and are not to be construed as limiting. The system can utilize any property, condition, state or any combination of factors described herein to determine if a message is to be selected for analysis.

When the system determines that there are two or more topics discovered within a message and when an incoming message pertains to one of the topics, the system can initiate a split of the message and the original thread 419 to generate child threads and divide the text content of the message between the generated threads. In some configurations, responsive to the identification of multiple topics, e.g., the first topic and the second topic, within the text content of the original message 151A, the system can cause the user interface 101A shown in FIG. 8A to split the original thread 419 and the original message 151A and transition to an updated user interface shown on the left side of FIG. 8B. The left side of FIG. 8B shows an updated user interface 101A for the first user that shows a first child thread 420A and a second child thread 420B that is based on the split of the original thread 419. Similarly, a set of child threads, the third child thread 420C and the fourth child thread 420D, that are based on the split of the original thread 419 can be displayed on an updated user interface to a second user.

The updated user interface for each user can include a first message 411A positioned in a first new child thread 420A and a second message 411B positioned in a second new child thread 420B. The first message 411A can comprise the first text portion of the original message 151A that is associated with the first topic 401A, e.g., "Hey Bob, Can we use service desk for NTT numbers?" In addition, the second message 411B can include the second text portion of the original message 151A that is associated with the second topic 401B, e.g., "And BTW, I liked the candidate for the MC site." Once the child threads are generated, the system can divide the remaining messages of the original thread into each child thread.

Thus, in response to a message received at the first computer, where the message pertains to either the first topic or the second topic, a computing device can transition from the user interface shown on the left side of FIG. 8A to the updated user interface shown on the left side of FIG. 8B. This may occur when a particular topic has a threshold priority level and when a message is received for that particular topic. The user interface 101B on the right side of FIG. 8B, illustrates how the display for the second user can be modified response to a split of a thread at another computer, such as the first computer 11A. Thus, when the first computing device splits a particular thread and topic labels are determined, the second computing device can display those topic labels associated with the messages.

Figure 9:
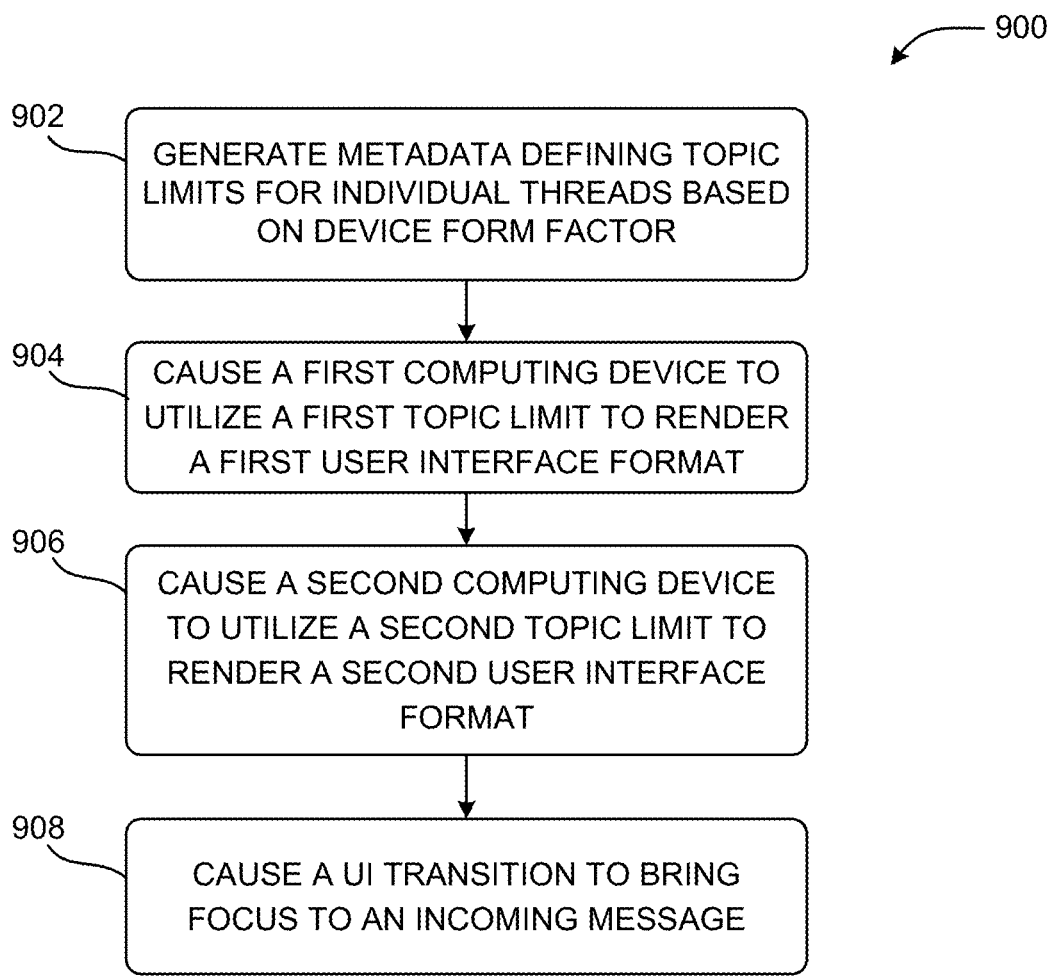
FIG. 9 is a flow diagram showing aspects of a routine that can coordinate user interface formats between a number of client computing devices used for communicating and displaying messages.

FIG. 9 is a diagram illustrating aspects of a routine 500 for coordinating user interface formats for message threads based on device form factors and/or topic limits. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 900 includes an operation 902 where the system causes one or more computing devices to generate metadata 152 defining topic limits for individual threads. In some configurations, the metadata 152, which is also referred to herein as a "data structure 152," defines a topic limit which causes some devices to only show a single thread of a topic to which an incoming message corresponds, while other devices show a multi-topic UI format for the same incoming message. For example, as shown in FIG. 1, Device 11D is a mobile phone which can cause a computer to select a topic limit of 1 or a first topic limit. A screen size smaller than a threshold limit can also cause a computer to select a topic limit of 1 or a first topic limit. In addition, a certain device type, such as mobile device, that also has a screen size smaller than a threshold size, can also cause a computer to select a topic limit of 1 or a first topic limit. The mobile device can use the topic limit to display only the thread to which the incoming message corresponds. If an incoming message pertains to a topic of a thread, the incoming message can be displayed with that thread. In some configurations, if an incoming message does not pertain to a topic of a thread, the incoming message can be filtered and not displayed with that thread. The other devices 11A-11C can cause the metadata to select a topic limit greater than 1 for devices having a second device type or second screen size, e.g., a personal computer or a large-screen device. Based on the screen size or device type, e.g., a topic limit greater than 1, a device can display a multi-topic UI format for the incoming message.

Thus, in operation 902, the system can cause a generation of metadata 152 defining a first topic limit that causes a first computing device 11D having a first display screen size or a first device type to only display a thread having a first topic to which an incoming message corresponds. The metadata 152 can further defines a second topic limit that causes other computing devices 11A-11C having other display screen sizes or other device types to display a multi-topic user interface format, wherein the multi-topic user interface format comprises messages corresponding to at least one topic to which the incoming message corresponds. In some configurations, the thread is a single-topic thread, and the first user interface format is a single-topic format, wherein the first topic limit is selected based on the first display screen size or the first device type, wherein the second topic limit is selected based on the other display screen sizes or the other device types.

Next, in operation 904, the system can cause a first computing device 11D to utilize the first topic limit of the metadata 152 to control a rendering of a first user interface format 101D. The first user interface format 101D that only displays the thread 171A having messages 190A pertaining to the first topic to which the incoming message 191 corresponds. In addition, the rendering of the first user interface format 101D can concurrently display the incoming message 191 with the messages 190A of the first topic. This can include a device, such as phone, e.g., the fourth client computer 11D of FIG. 1. For the incoming message 191, the fourth computer only displays the thread to which the incoming message corresponds. In other embodiments, the fourth computer displays the thread to which the incoming message corresponds and moves, modifies or otherwise brings highlight to the display of the thread to which the incoming message corresponds.

Next, in operation 906, the system can cause the other computing devices 11A-11C to utilize the second topic limit of the metadata 152 to render other user interface formats 101A-101C that displays multi-topic threads 171E-171G having messages 190E-190G pertaining to topics to which the incoming message 191 corresponds, wherein the rendering of the other user interface formats 101A-101C concurrently displays the incoming message 191 with the messages 190 of the topics. These other computers 11A-11C can include personal desktop computers or devices with multiple screens.

Next, in operation 908, the system can cause a user interface transition to bring focus to an incoming message or bring focus to the thread related to the incoming message. This operation can include hiding renderings of threads that are not related to the incoming message, enlarging a rendering of the thread related to the incoming message, rearranging or reconfiguring threads such that the thread related to the incoming message is positioned in a more prominent/visible location or configuration. Examples of such transitions are shown in FIG. 2 through FIG. 7. In one illustrative example, FIG. 2 shows an example where a thread having a topic pertaining to an incoming message is positioned in front of the other threads. In another example, as shown in FIG. 7, a user interface format comprises one or more threads pertaining to individual topics, and wherein the user interface format transitions to an updated user interface format that only displays the single thread having messages of the topic in response to the receipt of the incoming message.

In the embodiments disclosed herein, the execution of the transitions may be subject to additional criteria for the purposes of minimizing user disruption. For instance, if a user is interacting with a first thread and an incoming message is received for a second thread, the system can delay the transition of the user interface from the first thread to the second thread to allow the user to complete the interaction with the first thread. This can prevent disruption of the user interaction, e.g., a delay of the transition can allow the user to complete the composition of a message or allow the user to complete reading messages of the first thread. In addition to implementing a delay of the transition, the transition can also be based on a user's input to a device. For instance, a transition may be delayed while a user is providing key entries to a device. Thus, if a user is composing a message for the first thread, the system can control the user interface and prevent a transition to the second thread until the user has stopped providing input entries for a predetermined period of time. In another example, the transition can also be based on a user's eye gaze. Thus, using sensors directed towards a user, if the system detects that a user's eye movement indicates that the user is engaged with a particular message of the first thread, the system can control the user interface and prevent a transition to the second thread until the user's eye gaze gestures indicate they are no longer looking at the particular message of the first thread.

In some configurations, the topic limit can be influenced by a number of different factors. In one illustrative example, the topic limit can be influenced by the number of display screens of a device. If the system detects that the computer has a threshold number of device screens, the topic limit may be increased or decreased. In other embodiments, if the system detects that the computer has less than a threshold number of device screens, the topic limit may be increased or decreased. In some configurations, the system may increase or decrease a topic limit if a screen size is larger than a threshold. In one specific example, a topic limit is applied to a user interface format as a topic limit per thread. When determining topic limits for two different computers, the system may determine that a first topic limit a first computer or a first user is less than a second topic limit for a second user or a second computer if a first screen size of the first computer is smaller than the screen size of the second computer.

The routine can also include techniques for determining a topic limit based on a device type. For instance, a first topic limit for a first computer is less than the second topic for a second computer if the first device type of indicates a lower performance metrics than a second device type. The device type may indicate any type of form factor or performance metric, e.g., a physical size or a measurable physical dimension of a particular device, processing capabilities, memory capabilities, display capabilities, networking bandwidth capabilities, etc. In some configurations, a first device having higher performance metrics, e.g., a first computer has more memory, or a higher resolution, may cause a generation of a first topic limit and a second device having lower performance metrics or dimensions may cause a generation of a second topic limit. In some embodiments, the first topic limit is lower than the first topic limit. In some embodiments, the first topic limit can be higher than the first topic limit.

Figure 10:
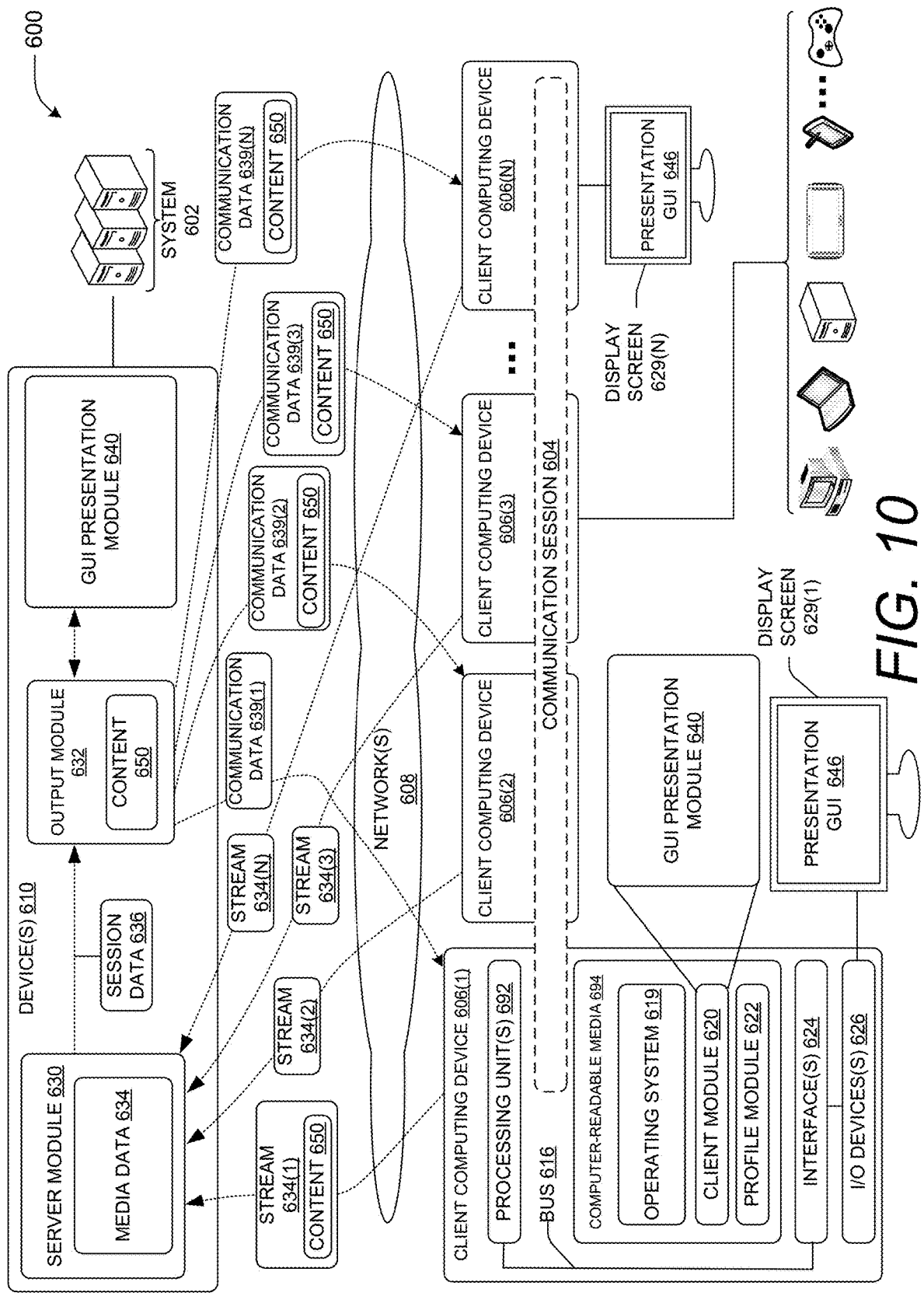
FIG. 10 is a computer architecture diagram illustrating an illustrative computer hardware and software architecture for a computing system capable of implementing aspects of the techniques and technologies presented herein.

FIG. 10 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 10 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 10 illustrates that client computing device 606(1) is in some way connected to a display device (e.g., a display screen 629(N)), which can display a UI according to the techniques described herein.

In the example environment 600 of FIG. 10, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 10) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may transmit communication data 639 to the client computing devices (e.g., client computing devices 606(1) through 606 (3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter.

In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 11:
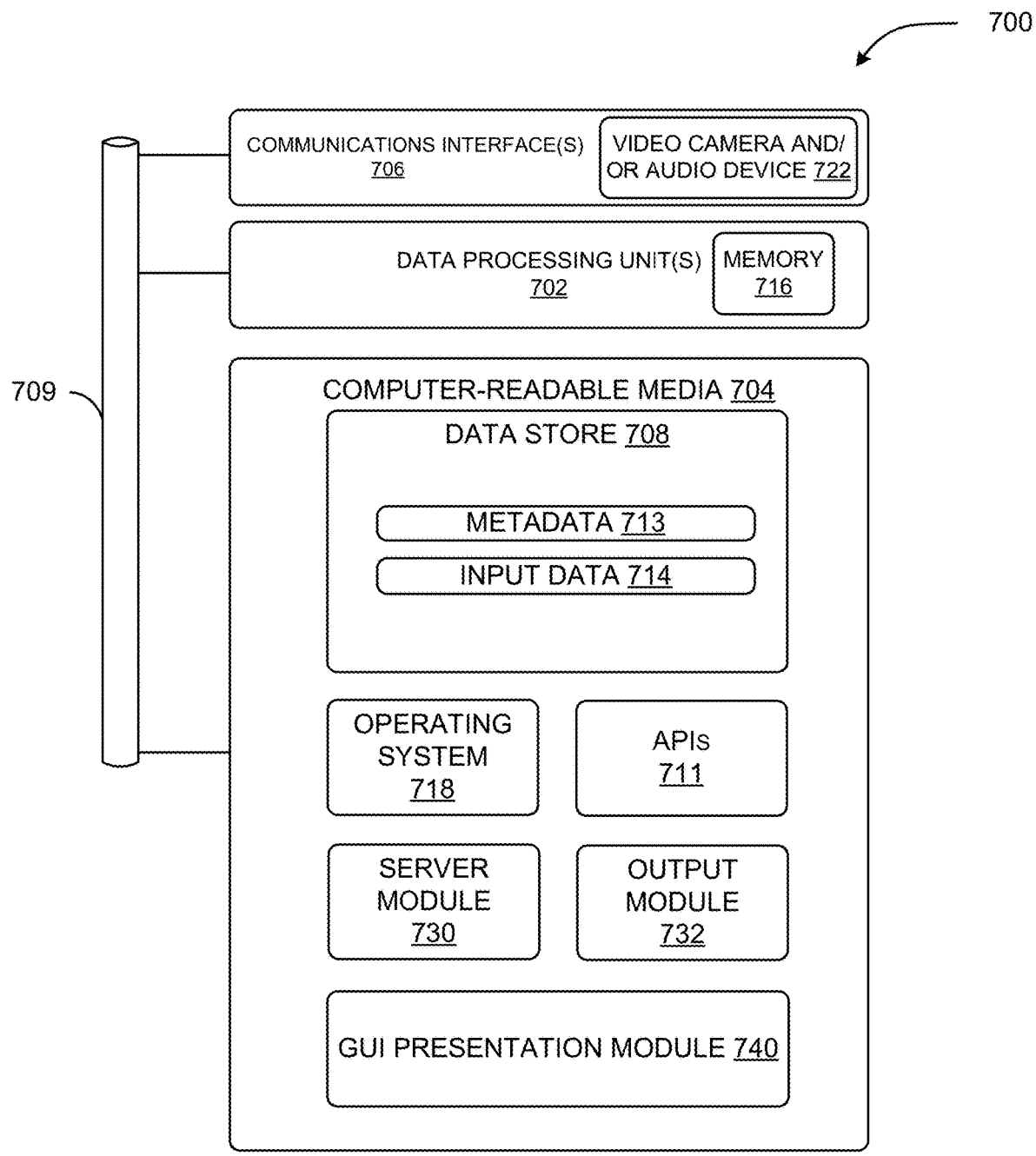
FIG. 11 is a diagram illustrating a distributed computing environment capable of implementing aspects of the techniques and technologies presented herein.

FIG. 11 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. The device 700 may represent one of any of the devices disclosed herein, e.g., device 606 of FIG. 10, device 11 of FIG. 1, or a server 602 of FIG. 10.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se. In one example, the computer storage media can be block 704 in FIG. 11 or block 694 in FIG. 10.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704, which can also be storage media, includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data (e.g., session data 636 as shown in FIG. 7), metadata 713 (e.g., the data structure shown and described herein), and/or other data such as input data 714, which can include voice commands, a mouse input, a touch input, or other definitions of input gestures. The session data can include a total number of participants (e.g., users and/or client computing devices) in a communication session, activity that occurs in the communication session, a list of invitees to the communication session, and/or other data related to when and how the communication session is conducted or hosted. The data store 708 may also include contextual data, such as the content that includes video, audio, or other content for rendering and display on one or more of the display screens 629. Hardware data 711 can define aspects of any device, such as a number of display screens of a computer. The contextual data can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for coordinating user interface formats for displaying messages on computing devices of a communication system, the method comprising:
    causing a generation of metadata defining a first topic limit that causes a first computing device having a first display screen size or a first device type to only display a thread having a first topic to which an incoming message corresponds, and wherein the metadata further defines a second topic limit that causes other computing devices having other display screen sizes or other device types to display a multi-topic user interface format, wherein the multi-topic user interface format comprises messages corresponding to at least one topic to which the incoming message corresponds;
    causing the first computing device to utilize the first topic limit of the metadata to render a first user interface format that only displays the thread having messages pertaining to the first topic to which the incoming message corresponds, wherein the rendering of the first user interface format concurrently displays the incoming message with the messages of the first topic; and
    causing the other computing devices to utilize the second topic limit of the metadata to render other user interface formats that displays multi-topic threads having messages pertaining to topics to which the incoming message corresponds, wherein the rendering of the other user interface formats concurrently displays the incoming message with the messages of the topics.

2. The method of claim 1, wherein the first user interface format and the other user interface formats comprise a number of threads each pertaining to individual topics, wherein the number of threads are rendered in a first arrangement where at least one thread of the number of threads is overlapping or obscuring a rendering of the thread having the first topic, and wherein the first arrangement transitions to a second arrangement where the at least one thread is not overlapping or not obscuring the rendering of the thread having the first topic when the incoming message is received.

3. The method of claim 1, wherein the first topic limit is applied to the first user interface format as a topic limit per thread, and wherein the first topic limit is less than the second topic limit if the first display screen size of the first computing device is smaller than a second screen size of a second computing device.

4. The method of claim 1, wherein the first topic limit is applied to the first user interface format as a topic limit per thread, and wherein the first topic limit is less than the second topic limit if a priority of the first topic is higher than a priority of a second topic.

5. The method of claim 1, wherein the first topic limit is applied to the first user interface format as a topic limit per thread, and wherein the first topic limit is less than the second topic limit if the first computing device has at least one performance metric that is lower than a performance metric of a second computing device.

6. The method of claim 1, wherein the first topic of the thread has a threshold priority level, wherein the threshold priority level prevents the multi-topic threads from overlapping or obscuring the rendering of the thread pertaining to the first topic.

7. The method of claim 1, wherein the first user interface format and the other user interface formats comprise a number of threads each pertaining to one or more topics, and wherein the first user interface format transitions to only displaying the thread having messages of the first topic after receipt of the incoming message.

8. The method of claim 1, wherein a rendering of the thread is in a original position having an original size prior to receipt of the incoming message, and wherein the thread is moved to a new position or the thread is resized in response to receiving the incoming message.

9. The method of claim 1, wherein a multi-topic thread of the multi-topic threads transitions to a single-topic thread, wherein the single-topic thread only shows messages pertaining to a single topic to which the incoming message corresponds.

10. A system for coordinating user interface formats for displaying messages on computing devices in communication with the system, the system comprising:
one or more processing units; and
a computer-readable storage medium having encoded thereon computer-executable instructions to cause the one or more processing units to:
cause a generation of metadata defining a first topic limit that causes a first computing device having a first display screen size or a first device type to only display a thread having a first topic to which an incoming message corresponds, and wherein the metadata further defines a second topic limit that causes other computing devices having other display screen sizes or other device types to display a multi-topic user interface format, wherein the multi-topic user interface format comprises messages corresponding to at least one topic to which the incoming message corresponds;
cause the first computing device to utilize the first topic limit of the metadata to render a first user interface format that only displays the thread having messages pertaining to the first topic to which the incoming message corresponds, wherein the rendering of the first user interface format concurrently displays the incoming message with the messages of the first topic; and
cause the other computing devices to utilize the second topic limit of the metadata to render other user interface formats that displays multi-topic threads having messages pertaining to topics to which one or more incoming messages correspond, wherein the rendering of the other user interface formats concurrently displays the one or more incoming messages with the messages of the topics.

11. The system of claim 10, wherein the first user interface format and the other user interface formats comprise a number of threads each pertaining to one or more topics, and wherein the first user interface format transitions to only displaying the thread having messages of the first topic after receipt of the incoming message.

12. The system of claim 10, wherein the first topic limit is applied to the first user interface format as a topic limit per thread, and wherein the first topic limit is less than the second topic limit if the first display screen size of the first computing device is smaller than a second screen size of a second computing device.

13. The system of claim 10, wherein the first topic limit is applied to the first user interface format as a topic limit per thread, and wherein the first topic limit is less than the second topic limit if a priority of the first topic is higher than a priority of a second topic.

14. The system of claim 10, wherein the first topic limit is applied to the first user interface format as a topic limit per thread, and wherein the first topic limit is less than the second topic limit if the first computing device has at least one performance metric that is lower than a performance metric of a second computing device.

15. The system of claim 10, wherein the first user interface format and the other user interface formats comprise a number of threads each pertaining to one or more topics, wherein the number of threads are rendered in a first arrangement where at least one thread of the number of threads is overlapping or obscuring a rendering of the thread having the first topic, and wherein the first arrangement transitions to a second arrangement where the at least one thread is not overlapping or not obscuring the rendering of the thread having the first topic when the incoming message is received.

16. One or more computer-readable storage media having encoded thereon computer-executable instructions to cause the one or more processing units of a system to:
cause a generation of metadata defining a first topic limit that causes a first computing device having a first display screen size or a first device type to only display a thread having a first topic to which an incoming message corresponds, and wherein the metadata further defines a second topic limit that causes other computing devices having other display screen sizes or other device types to display a multi-topic user interface format, wherein the multi-topic user interface format comprises messages corresponding to at least one topic to which the incoming message corresponds;
cause the first computing device to utilize the first topic limit of the metadata to render a first user interface format that only displays the thread having messages pertaining to the first topic to which the incoming message corresponds, wherein the rendering of the first user interface format concurrently displays the incoming message with the messages of the first topic; and
cause the other computing devices to utilize the second topic limit of the metadata to render other user interface formats that displays multi-topic threads having messages pertaining to topics to which one or more incoming messages correspond, wherein the rendering of the other user interface formats concurrently displays the one or more incoming messages with the messages of the topics.

17. The one or more computer-readable storage media of claim 16, wherein the first user interface format and the other user interface formats comprise a number of threads each pertaining to one or more topics, and wherein the first user interface format transitions to only displaying the thread having messages of the first topic after receipt of the incoming message.

18. The one or more computer-readable storage media of claim 16, wherein the first topic limit is applied to the first user interface format as a topic limit per thread, and wherein the first topic limit is less than the second topic limit if the first display screen size of the first computing device is smaller than a second screen size of a second computing device.

19. The one or more computer-readable storage media of claim 16, wherein the first topic limit is applied to the first user interface format as a topic limit per thread, and wherein the first topic limit is less than the second topic limit if a priority of the first topic is higher than a priority of a second topic.

20. The one or more computer-readable storage media of claim 16, wherein the first topic limit is applied to the first user interface format as a topic limit per thread, and wherein the first topic limit is less than the second topic limit if the first computing device has at least one performance metric that is lower than a performance metric of a second computing device.

* * * * *